(12) United States Patent
Huang

(10) Patent No.: US 12,084,000 B2
(45) Date of Patent: Sep. 10, 2024

(54) CUSTOM VEHICULAR ROOF TOP CARGO CARRIER KIT

(71) Applicant: Jason Huang, Oakland Gardens, NY (US)

(72) Inventor: Jason Huang, Oakland Gardens, NY (US)

( * ) Notice: Subject to any disclaimer, the term of this patent is extended or adjusted under 35 U.S.C. 154(b) by 118 days.

(21) Appl. No.: 17/803,669

(22) Filed: Sep. 30, 2022

(65) Prior Publication Data

US 2023/0085952 A1    Mar. 23, 2023

Related U.S. Application Data

(63) Continuation-in-part of application No. 17/300,678, filed on Sep. 22, 2021, now Pat. No. 11,535,166.

(51) Int. Cl.
*B60R 9/045* (2006.01)

(52) U.S. Cl.
CPC .................. *B60R 9/045* (2013.01)

(58) Field of Classification Search
CPC ........................................ B60R 9/045
USPC ........................................ 224/326
See application file for complete search history.

(56) References Cited

U.S. PATENT DOCUMENTS

| | | | | |
|---|---|---|---|---|
| 2,557,766 A * | 6/1951 | Ronfeldt | ........... | F16B 7/0446 403/258 |
| 3,002,664 A * | 10/1961 | Guevara | ........... | B60R 9/045 224/314 |
| 3,223,301 A * | 12/1965 | Helm | ........... | B60R 9/045 224/326 |
| 4,013,372 A * | 3/1977 | Lay | ........... | F16B 7/18 403/258 |
| 4,183,190 A * | 1/1980 | Bance | ........... | E04B 1/19 52/655.2 |
| 4,264,230 A * | 4/1981 | Vanderminden | ........... | F16B 7/0446 403/182 |
| 5,009,337 A * | 4/1991 | Bimbi | ........... | B60R 9/00 224/400 |
| 5,230,581 A * | 7/1993 | Deng | ........... | F16B 7/18 403/260 |
| 5,531,367 A * | 7/1996 | Ravier | ........... | B60R 9/058 224/329 |
| 6,203,239 B1 * | 3/2001 | Mucciaccciaro | ........... | F16B 7/025 403/256 |
| 6,264,878 B1 * | 7/2001 | Busby | ........... | B62K 19/16 280/281.1 |
| 6,626,307 B1 * | 9/2003 | Lin | ........... | A47G 25/0664 211/206 |

(Continued)

*Primary Examiner* — Peter N Helvey
(74) *Attorney, Agent, or Firm* — Richard L. Strauss, Esq.

(57) ABSTRACT

A custom roof top cargo carrier kit is disclosed that enables an end user to assemble and mount a cargo carrier demonstrating a desired custom length suitable for a variety of roof top mounting. The carrier utilizes multiple side rail segments in a wide range of predetermined lengths. The custom roof top cargo carrier utilizes tubular shaped side rail segments joined via centrally placed assembly studs aligned with the longitudinal axis of each segment so as to form complete side rails. This means of affixation provides a solid butt joint yielding increased resistance to forces that ordinarily cause failure of prior art side rails. In an alternate preferred embodiment, the side rail segment and side rails formed thereby is also disclosed as an independent component for integration in other roof top cargo carriers utilizing side rails.

16 Claims, 31 Drawing Sheets

(56) References Cited

U.S. PATENT DOCUMENTS

| | | | | |
|---|---|---|---|---|
| 9,827,915 | B1* | 11/2017 | Chappell | B60R 9/045 |
| 10,005,402 | B2* | 6/2018 | Huang | B60R 9/042 |
| 10,369,934 | B2* | 8/2019 | Wang | B60R 9/045 |
| 11,486,429 | B1* | 11/2022 | Henderson | F16B 7/18 |
| 2008/0283564 | A1* | 11/2008 | Dinsmore | B60R 9/04 |
| | | | | 224/319 |
| 2010/0072237 | A1* | 3/2010 | Green | B60R 9/00 |
| | | | | 296/3 |
| 2010/0327033 | A1* | 12/2010 | Payne | B60R 9/058 |
| | | | | 224/326 |
| 2020/0132194 | A1* | 4/2020 | Wang | F16B 7/182 |
| 2021/0039721 | A1* | 2/2021 | Foreman | B60R 9/045 |
| 2021/0387575 | A1* | 12/2021 | Yang | B60R 9/045 |

* cited by examiner

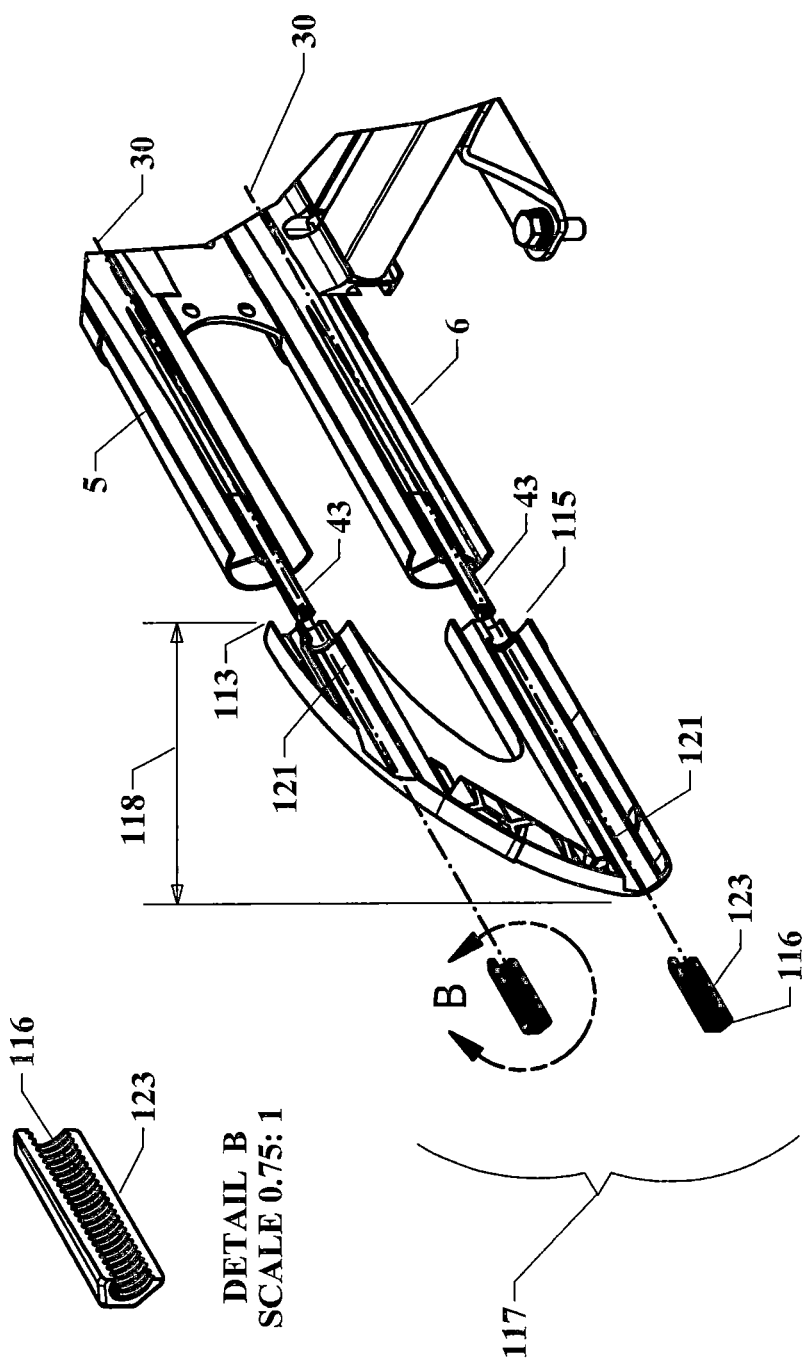

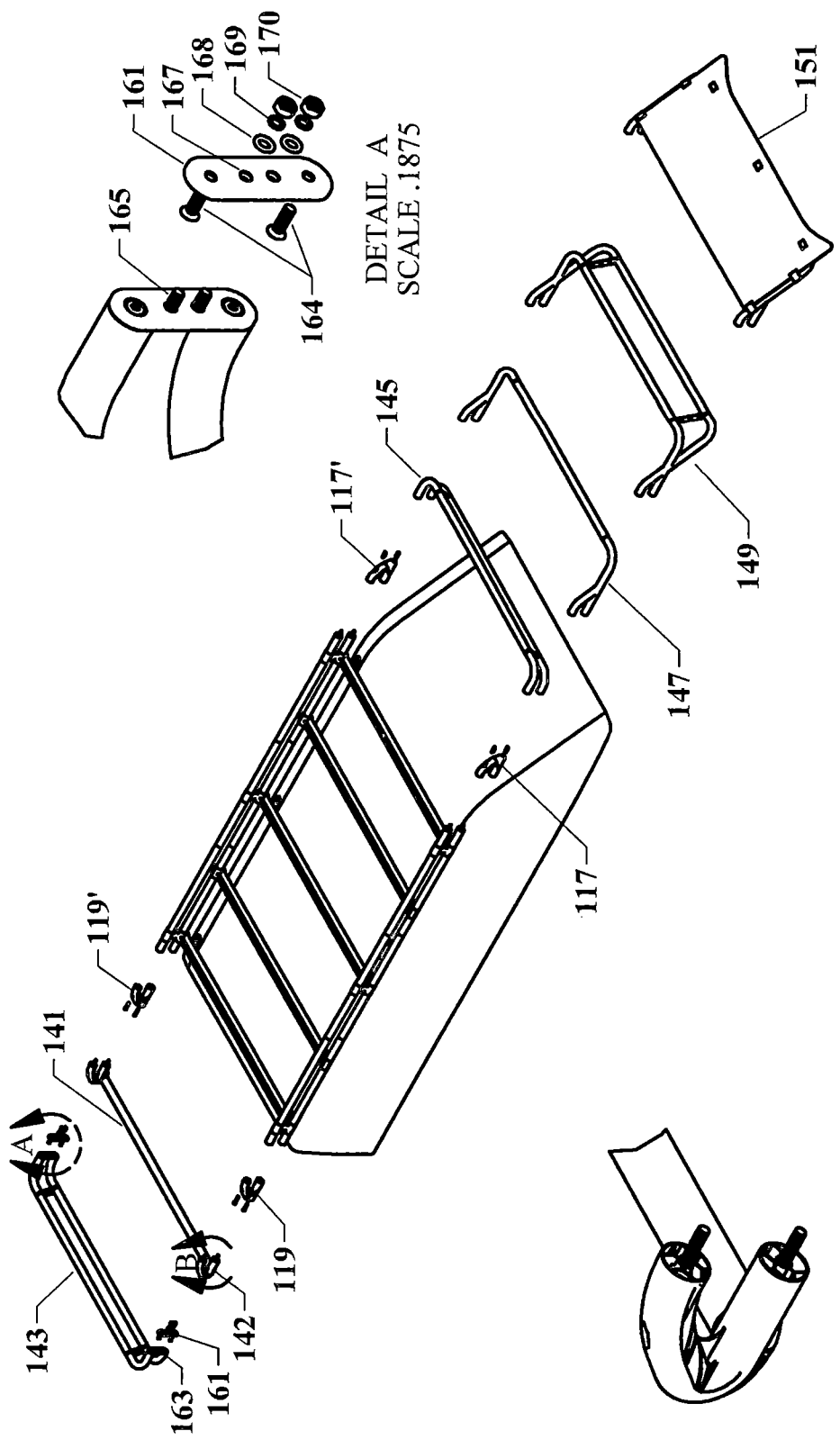

TABLE 1

| Side Rail Length | S1 | S2 | Side Rail Length | S1 | S2 | S3 | Side Rail Length | S1 | S2 | S3 | S4 | Side Rail Length | S1 | S2 | S3 | S4 | S5 |
|---|---|---|---|---|---|---|---|---|---|---|---|---|---|---|---|---|---|
| 1 | n/a | | | | | | | | | | | | | | | | |
| 2 | n/a | | | | | | | | | | | | | | | | |
| 3 | 3 | | | | | | | | | | | | | | | | |
| 4 | 4 | | | | | | | | | | | | | | | | |
| 5 | 5 | | | | | | | | | | | | | | | | |
| 6 | 6 | | | | | | | | | | | | | | | | |
| 7 | 7 | | | | | | | | | | | | | | | | |
| 8 | 8 | | | | | | | | | | | | | | | | |
| 9 | 9 | | | | | | | | | | | | | | | | |
| 10 | 10 | | | | | | | | | | | | | | | | |
| 11 | 11 | | | | | | | | | | | | | | | | |
| 12 | 12 | | | | | | | | | | | | | | | | |
| 13 | 13 | | | | | | | | | | | | | | | | |
| 14 | 14 | | | | | | | | | | | | | | | | |

Fig. 17

| Side Rail Length | S1 | S2 | Side Rail Length | S1 | S2 | S3 | Side Rail Length | S1 | S2 | S3 | S4 | Side Rail Length | S1 | S2 | S3 | S4 | S5 |
|---|---|---|---|---|---|---|---|---|---|---|---|---|---|---|---|---|---|
| 15 | 8 | 7 | 75 | 36 | 36 | 3 | 135 | 36 | 48 | 36 | 3 | 195 | 48 | 48 | 48 | 48 | 3 |
| 16 | 8 | 9 | 76 | 36 | 36 | 4 | 136 | 36 | 48 | 36 | 4 | 196 | 48 | 48 | 48 | 48 | 4 |
| 17 | 9 | 8 | 77 | 36 | 36 | 5 | 137 | 36 | 48 | 36 | 5 | 197 | 48 | 48 | 48 | 48 | 5 |
| 18 | 9 | 9 | 78 | 36 | 36 | 6 | 138 | 36 | 48 | 36 | 6 | 198 | 48 | 48 | 48 | 48 | 6 |
| 19 | 10 | 9 | 79 | 36 | 36 | 7 | 139 | 36 | 48 | 36 | 7 | 199 | 48 | 48 | 48 | 48 | 7 |
| 20 | 10 | 10 | 80 | 36 | 36 | 8 | 140 | 36 | 48 | 36 | 8 | 200 | 48 | 48 | 48 | 48 | 8 |
| 21 | 11 | 10 | 81 | 36 | 36 | 9 | 141 | 36 | 48 | 36 | 9 | 201 | 48 | 48 | 48 | 48 | 9 |
| 22 | 11 | 11 | 82 | 36 | 36 | 10 | 142 | 36 | 48 | 36 | 10 | 202 | 48 | 48 | 48 | 48 | 10 |
| 23 | 12 | 11 | 83 | 36 | 36 | 11 | 143 | 36 | 48 | 48 | 11 | 203 | 48 | 48 | 48 | 48 | 11 |
| 24 | 24 | — | 84 | 48 | 36 | — | 144 | 48 | 48 | 36 | — | 204 | 48 | 48 | 48 | 48 | — |
| 25 | 12 | 13 | 85 | 36 | 36 | 13 | 145 | 36 | 48 | 36 | 13 | 205 | 48 | 48 | 48 | 48 | 13 |
| 26 | 13 | 13 | 86 | 36 | 36 | 14 | 146 | 36 | 48 | 48 | 14 | 206 | 48 | 48 | 48 | 48 | 14 |
| 27 | 13 | 14 | 87 | 48 | 36 | 3 | 147 | 48 | 48 | 48 | 3 | 207 | 60 | 48 | 48 | 48 | 3 |
| 28 | 14 | 14 | 88 | 48 | 36 | 4 | 148 | 48 | 48 | 48 | 4 | 208 | 60 | 48 | 48 | 48 | 4 |
| 29 | 24 | 5 | 89 | 48 | 36 | 5 | 149 | 48 | 48 | 48 | 5 | 209 | 60 | 48 | 48 | 48 | 5 |
| 30 | 24 | 6 | 90 | 48 | 36 | 6 | 150 | 48 | 48 | 48 | 6 | 210 | 60 | 48 | 48 | 48 | 6 |

Fig. 18

| Side Rail Length | S1 | S2 | Side Rail Length | S1 | S2 | S3 | Side Rail Length | S1 | S2 | S3 | S4 | Side Rail Length | S1 | S2 | S3 | S4 | S5 |
|---|---|---|---|---|---|---|---|---|---|---|---|---|---|---|---|---|---|
| 31 | 24 | 7 | 91 | 48 | 36 | 7 | 151 | 48 | 48 | 48 | 7 | 211 | 60 | 48 | 48 | 48 | 7 |
| 32 | 24 | 8 | 92 | 48 | 36 | 8 | 152 | 48 | 48 | 48 | 8 | 212 | 60 | 48 | 48 | 48 | 8 |
| 33 | 24 | 9 | 93 | 48 | 36 | 9 | 153 | 48 | 48 | 48 | 9 | 213 | 60 | 48 | 48 | 48 | 9 |
| 34 | 24 | 10 | 94 | 48 | 36 | 10 | 154 | 48 | 48 | 48 | 10 | 214 | 60 | 48 | 48 | 48 | 10 |
| 35 | 24 | 11 | 95 | 48 | 36 | 11 | 155 | 48 | 48 | 48 | 11 | 215 | 60 | 48 | 48 | 48 | 11 |
| 36 | 36 | - | 96 | 48 | 48 | - | 156 | 60 | 48 | 48 | - | 216 | 60 | 48 | 48 | 48 | - |
| 37 | 24 | 13 | 97 | 48 | 38 | 13 | 157 | 48 | 48 | 48 | 13 | 217 | 60 | 48 | 48 | 48 | 13 |
| 38 | 24 | 14 | 98 | 48 | 36 | 14 | 158 | 48 | 48 | 48 | 14 | 218 | 60 | 48 | 48 | 48 | 14 |
| 39 | 36 | 3 | 99 | 48 | 48 | 3 | 159 | 60 | 48 | 48 | 3 | 219 | 60 | 60 | 48 | 48 | 3 |
| 40 | 36 | 4 | 100 | 48 | 48 | 4 | 160 | 60 | 48 | 48 | 4 | 220 | 60 | 60 | 48 | 48 | 4 |
| 41 | 36 | 5 | 101 | 48 | 48 | 5 | 161 | 60 | 48 | 48 | 5 | 221 | 60 | 60 | 48 | 48 | 5 |
| 42 | 36 | 6 | 102 | 48 | 48 | 6 | 162 | 60 | 48 | 48 | 6 | 222 | 60 | 60 | 48 | 48 | 6 |
| 42 | 36 | 7 | 103 | 48 | 48 | 7 | 163 | 60 | 48 | 48 | 7 | 223 | 60 | 60 | 48 | 48 | 7 |
| 44 | 36 | 8 | 104 | 48 | 48 | 8 | 164 | 60 | 48 | 48 | 8 | 224 | 60 | 60 | 48 | 48 | 8 |
| 45 | 36 | 9 | 105 | 48 | 48 | 9 | 165 | 60 | 48 | 48 | 9 | 225 | 60 | 60 | 48 | 48 | 9 |
| 46 | 36 | 10 | 106 | 48 | 48 | 10 | 166 | 60 | 48 | 48 | 10 | 226 | 60 | 60 | 48 | 48 | 10 |

Fig. 19

| Side Rail Length | S1 | S2 | Side Rail Length | S1 | S2 | S3 | Side Rail Length | S1 | S2 | S3 | S4 | Side Rail Length | S1 | S2 | S3 | S4 | S5 |
|---|---|---|---|---|---|---|---|---|---|---|---|---|---|---|---|---|---|
| 47 | 36 | 11 | 107 | 48 | 48 | 11 | 167 | 60 | 48 | 48 | 11 | 227 | 60 | 60 | 48 | 48 | 11 |
| 48 | 48 | - | 108 | 60 | 48 | - | 168 | 60 | 60 | 48 | - | 228 | 60 | 60 | 60 | 48 | - |
| 49 | 36 | 13 | 109 | 48 | 48 | 13 | 169 | 60 | 48 | 48 | 13 | 229 | 60 | 60 | 48 | 48 | 13 |
| 50 | 36 | 14 | 110 | 48 | 48 | 14 | 170 | 60 | 48 | 48 | 14 | 230 | 60 | 60 | 48 | 48 | 14 |
| 51 | 48 | 3 | 111 | 60 | 48 | 3 | 171 | 60 | 60 | 48 | 3 | 231 | 60 | 60 | 60 | 48 | 3 |
| 52 | 48 | 4 | 112 | 60 | 48 | 4 | 172 | 60 | 60 | 48 | 4 | 232 | 60 | 60 | 60 | 48 | 4 |
| 53 | 48 | 5 | 113 | 60 | 48 | 5 | 173 | 60 | 60 | 48 | 5 | 233 | 60 | 60 | 60 | 48 | 5 |
| 54 | 48 | 6 | 114 | 60 | 48 | 6 | 174 | 60 | 60 | 48 | 6 | 234 | 60 | 60 | 60 | 48 | 6 |
| 55 | 48 | 7 | 115 | 60 | 48 | 7 | 175 | 60 | 60 | 48 | 7 | 235 | 60 | 60 | 60 | 48 | 7 |
| 56 | 48 | 8 | 116 | 60 | 48 | 8 | 176 | 60 | 60 | 48 | 8 | 236 | 60 | 60 | 60 | 48 | 8 |
| 57 | 48 | 9 | 117 | 60 | 48 | 9 | 177 | 60 | 60 | 48 | 9 | 237 | 60 | 60 | 60 | 48 | 9 |
| 58 | 48 | 10 | 118 | 60 | 48 | 10 | 178 | 60 | 60 | 48 | 10 | 238 | 60 | 60 | 60 | 48 | 10 |
| 59 | 48 | 11 | 119 | 60 | 48 | 11 | 179 | 60 | 60 | 48 | 11 | 239 | 60 | 60 | 60 | 48 | 11 |
| 60 | 60 | - | 120 | 60 | 60 | - | 180 | 60 | 60 | 60 | - | 240 | 60 | 60 | 60 | 60 | - |
| 61 | 48 | 13 | 121 | 60 | 48 | 13 | 181 | 60 | 60 | 48 | 13 | 241 | 60 | 60 | 60 | 48 | 13 |
| 62 | 48 | 14 | 122 | 60 | 48 | 14 | 182 | 60 | 60 | 48 | 14 | 242 | 60 | 60 | 60 | 48 | 14 |

Fig. 20

| Side Rail Length | S1 | S2 | Side Rail Length | S1 | S2 | S3 | Side Rail Length | S1 | S2 | S3 | S4 | Side Rail Length | S1 | S2 | S3 | S4 | S5 |
|---|---|---|---|---|---|---|---|---|---|---|---|---|---|---|---|---|---|
| 63 | 60 | 3 | 123 | 60 | 60 | 3 | 183 | 60 | 60 | 60 | 3 | | | | | | |
| 64 | 60 | 4 | 124 | 60 | 60 | 4 | 184 | 60 | 60 | 60 | 4 | | | | | | |
| 65 | 60 | 5 | 125 | 60 | 60 | 5 | 185 | 60 | 60 | 60 | 5 | | | | | | |
| 66 | 60 | 6 | 126 | 60 | 60 | 6 | 186 | 60 | 60 | 60 | 6 | | | | | | |
| 67 | 60 | 7 | 127 | 60 | 60 | 7 | 187 | 60 | 60 | 60 | 7 | | | | | | |
| 68 | 60 | 8 | 128 | 60 | 60 | 8 | 188 | 60 | 60 | 60 | 8 | | | | | | |
| 69 | 60 | 9 | 129 | 60 | 60 | 9 | 189 | 60 | 60 | 60 | 9 | | | | | | |
| 70 | 60 | 10 | 130 | 60 | 60 | 10 | 190 | 60 | 60 | 60 | 10 | | | | | | |
| 71 | 60 | 11 | 131 | 60 | 60 | 11 | 191 | 60 | 60 | 60 | 11 | | | | | | |
| 72 | 36 | 36 | 132 | 48 | 48 | 36 | 192 | 48 | 48 | 48 | 48 | | | | | | |
| 73 | 60 | 13 | 133 | 60 | 60 | 13 | 193 | 60 | 60 | 60 | 13 | | | | | | |
| 74 | 60 | 14 | 134 | 60 | 60 | 14 | 194 | 60 | 60 | 60 | 14 | | | | | | |

Fig. 21

CUSTOM VEHICULAR ROOF TOP CARGO CARRIER KIT

CROSS-REFERENCE TO RELATED APPLICATION

This application is a continuation-in-part application of U.S. patent application Ser. No. 17/300,678 filed Sep. 22, 2021.

TECHNICAL FIELD

The present invention relates to the field of vehicular roof top carriers. More specifically, the disclosed device relates to vehicular roof top carriers which are assembled from components enabling a great degree of control in regard to configuring the fore/aft size of such carriers as well as the height thereof to conform to a particular vehicle or cargo requirement.

BACKGROUND OF THE INVENTION

Vehicle roof top cargo carriers, especially those designed for mounting upon the roof of a van or truck, are rather large, unwieldy accessories that are difficult to ship. For this reason, in the past, roof top carriers have been manufactured in an unassembled form comprising subassemblies, segments or parts. Such carriers enabled more compact shipping packages and thus easier distribution. Such unassembled or partially assembled carriers typically included side rail segments (subassemblies) that could be assembled to form and result in full length side rails of a few, limited predetermined lengths. Some such side rail assemblies have been comprised of a single side rail while others have utilized a vertically aligned double side rail configuration. The side rails for roof top carriers provide the basic fore/aft dimension/framework and substantially dictate the fore/aft length of the assembled carrier. The assembled side rails also provide mounting points for cross bars that traditionally run perpendicular to and from the right to left side rails to provide support for cargo placed upon the carrier. For most applications, the left and right side rails run a substantial portion of the full length of a vehicle roof—typically adjacent and parallel to a mounting flange or mounting groove incorporated within the roof structure by the vehicle manufacture.

Those unassembled or partially assembled roof top carriers of the prior art that have enabled compact packaging of roof top carriers have been configured and designed to connect sided rail segments—the lengths of rail that are joined to form a complete side rail—by, for example, utilizing a coupling connector that slides within the ends of two such segments which include an inner space or bore that accepts such couplings. Some of these prior art carriers utilize screws or bolts that are passed through the side surfaces of rail segments and the coupling connector inserted within end portions of such segment in order to affix two or more segments together to produce an assembled side rail of a predetermined length. For this purpose, such side segments included, in some examples, prepared screw or bolt bores that enabled placement of such fasteners through the segments to be joined as well as the coupler that was inserted therewithin so as to join such segments. Other designs have utilized side rail segments shaped and configured as hollow bars which included a portion, near one end of each segment, that is of diminished dimension (such as a diameter) and an opposite end of a greater dimension. This design allows the segment end of a lesser dimension to be coaxially placed within the end of a second rail segment having a larger dimension. In this design, the larger and smaller dimensioned ends—typically a hollow tube or polygonal design—is especially shaped and configured to allow a firm mating engagement upon insertion. Thereafter, as in the case of designs utilizing a coupler, screws or bolts pass through the side rail segments end of larger dimension and engage the side rail segments of lesser dimension that has been fitted therewithin to form a side rail of a predetermined length.

Both prior art designs of affixing segments of side rails together include inherent design weakness in regard to the strength and stress resistance of the side rails. For example, prior art carriers utilizing side rails which required connection of adjacent side rail segments via external brackets utilize screws or bolts to affix such brackets to adjacent termini of such segments. U.S. patent application Ser. No. 15/930,264 (Pub. No. US2020/031393 A1) discloses such a design and configuration. As described at paragraph and illustrated in FIG. 7a-7e of the '264 application, the disclosed side rail segments are placed in longitudinal alignment with a terminus of each segment in contact with the adjacent segment. The segments are then affixed to one another via "rail bracket" 220 which is positioned, external to the rail segments, adjacent and overlapping the termini. Screws 400 pass through the bracket at positions overlapping adjacent rails 210 & 210B so as to affix the rail segments together. Since the screws affix the rail segments at the outer portion thereof, as opposed to more internal affixation, such screws and the bores through which they pass are especially subject to weakening and breakage when the side rails experience load bearing lateral stress.

U.S. patent application Ser. No. 15/770,776 improves, somewhat, upon the above-described inherent weakness of prior art side rail assembly by utilizing side rail segments having an internal portion 126 where "the first end 142 (of the internal portion) and an opposing second end 146 wherein the first end 142 includes a first attachment end 144 and the second end 146 includes a attachment end 148. The first attachment end 144 may be configured to attach to the second attachment end 148.". Lines 17-13 and FIG. 26 of the '766 app). The '766 discloses a type of snap fit method and configuration for affixing side rail segments to one another. Although the '766 places affixation means at the internal portion of the side rail segments, it utilizes a snap fit, or tongue and aperture means of actual affixation. Such a snap fit methodology includes other inherent design weaknesses such as disengagement during carrier flexing and breakage of such snap fit extension technology.

Side rails are subject to flexing due to vehicle movement as well as cargo load stress upon the side rails and cross bars attached thereto that run perpendicular to the side rails and upon which cargo is placed. Such flexing tends to transfer stress to the side rails, especially at the points where side rail segments have been affixed to one another. Such flexing as well as shear forces associated therewith are transferred to assembly screws or bolts utilized in side rails segments joined with external brackets as well as those utilizing insert connectors and internal mortise like attachments as seen in the '766 application, discussed above. Such forces can cause the bores through with fasteners attach external brackets to enlarge and thus weaken segment assembly points or, in some instances, may cause shearing of assembly screws/bolts thus weakening and, in some instances, causing failure of the assembled side rail. The fact that the fastener passes through and joins such segments at the peripheral walls of such segments—where movement from flexing under stress is greatest—as opposed to a more central, internal portion of the segment—generally exposes such fasteners to a higher degree of stress. Tongue and groove as well as other technologies that teach insertion of side rail segment's demonstrating one end, with a larger dimension into an adjacent segment's termini having a relatively smaller diameter (similar to a coaxial fit), are subject to failure due to the same forces. In addition, the prior art designs require substantial effort and time to attain the correct alignment for mortised type designs (such as disclosed by the '766 application) as well as the time and effort required to fasten such segments with external brackets requiring the placement of multiple screws.

It would be highly advantageous if a vehicle roof top carrier could be disclosed which provided a means of assembling side rails in such a manner as to avoid the aforementioned inherent weakness of both coaxial, tongue and groove, insert and similar prior art designs. It would be still further advantageous if such disclosed carrier could incorporate a fastening system highly resistant to the bore enlargening/shearing forces discussed above by, in part, avoiding affixing such segments at the peripheral portion thereof and utilizing an internal centered affixation means more resistant to deformation and failure. It would be of further advantage to disclose a modular vehicular roof top carrier which utilized side rail segments that could be assembled rapidly, with great ease, little effort, and without the need for external parts.

In addition to the side rail segment assembly limitations of the prior art, such unassembled or partially assembled roof top cargo carriers, although easier to ship were available with only a few side rail segment length selections of pre-determined lengths. Assembly of these limited segments dictated the overall roof top carrier length (fore/aft dimension across a vehicle roof) which the prior art was capable of providing. These limitations, have had some effect on the ability of one to find a roof top carrier suitable for a passenger car, SUV or other non-commercial use vehicle. However, as to commercial vehicles, limiting the selection of overall side rail, and thus overall carrier length (fore/aft) dimensions to just a few choices is a far greater problem. More specifically, van, truck and other commercial vehicle roof dimensions, including fore/aft dimensions, vary widely. This is especially true in regard to custom vans and trucks—where "one size" or several sizes just won't fit all applications. In the past, one was often relegated to providing a manufacture with a particular commercial vehicles fore-aft roof dimension, so that an expensive, difficult to ship carrier could be produced.

In order to provide greater flexibility and suitability, especially to the commercial vehicle market, it would be highly advantageous if a modular roof top cargo carrier could be disclosed which enabled the assembly of a custom carrier without a fixed predetermined length. It would be highly advantageous if a carrier were disclosed that would enable an end user to configure the length of the carrier to virtually any desired length, and/or configure the carrier to overly that portion of the roof top the user desired to overly with the carrier.

Vehicular roof carriers of the past have been utilized in conjunction with accessories such as fog light bars, rolling cargo loading assist bars, air deflectors/spoilers as well as other roof top mounted devices. However, such accessories, in the past, have comprised add on features that were either mounted directly to the vehicle roof via independent brackets or rather crudely attached to an otherwise typical cargo carrier via universal type brackets. It would be highly advantageous if a vehicular roof top cargo carrier were disclosed which was highly adapted to integration of roof top accessories by incorporating such directly into the structure of the carrier.

SUMMARY OF THE INVENTION

Now, in accordance with the present invention, a custom vehicular roof top cargo carrier and carrier kit is disclosed. The kit enables the assembly of left and right side rails of a wide range of custom lengths which, in turn, largely define the fore-aft length of the carrier. Such custom length side rails are assembled from side rail segments provided in a wide range of predetermined lengths which can be quickly and easily assembled to form complete side rails of a desired length. The large variation in side rail segments lengths enables the assembly of a carrier whose fore/aft dimension conforms very closely to a wide array of vehicles. The side rail segments that form the custom length side rails are tubular in shape and are connected to one another through the use of assembly struts which are positioned and located centrally, within assembly strut receivers, aligned with the longitudinal axis of the rail segments. As discussed in more detail below, the assembly struts as well as assembly strut receivers—located adjacent to the ends of each segment—are dimensioned so that when each strut is positioned completely within the assembly stud receiver of adjacent segments, such struts provide for the creation of butt joints which are highly resistant to stress failure and deformation. In a preferred embodiment of the present invention the kit enables assembly of side rail segments into two upper and two lower side rails which are positioned and held in vertical alignment as described in more detail, below.

The custom vehicle roof top carrier of the present invention is comprised of a plurality of side rail segments, segment assembly studs, side rail coupler/crossbar adapters, and roof mounting bases. It is preferred that the custom roof top carrier kit of the present invention also includes at least three primary crossbars and, in certain preferred embodiments, four rail ends, discussed below. However, incorporation of such rail ends is optional. In fact, in certain alternate preferred embodiments of the present invention, accessory bars, which may also be referred to as "accessory mounting bars" with equal meaning, as discussed below, may be utilized and be affixed to the fore end, aft end or both the fore and aft end of the assembled side rails to join said side rails.

The side rail segments of the present invention are shaped and formed as round tubes having a length, a diameter, a fore end, an aft end and a longitudinal axis running along a radial center thereof. The side rail segments, which are proved in assorted lengths, each includes two assembly stud receivers located therewithin positioned proximal to the fore and aft termini. The side rail segments may be solid or hollow.

The assembly stud receivers within the side rail segments are shaped and configured to include a hub with a threaded central bore. The bore demonstrates a depth—a length in which the assembly stud can be seated—. The threaded bore is positioned in longitudinal alignment with the longitudinal axis of the segment. In the preferred embodiment of the present invention, the depth of the threaded central bore is selected to be equal to one half the length of the side rail segment assembly stud. It can also be described as selecting an assembly stud that demonstrates a length twice that of the depth of the threaded central bore. However, it is preferred that the stud demonstrates a length just shy of twice the depth of the threaded bore. In this way, it will be certain that threading the stud all the way into the threaded bore of a coupled pair of side rail segments will definitely result in a closed butt joint. In any case, the assembly stud is shaped to include threads which correspond to and will matingly engage the threaded central bore whereby, when the assembly stud is threaded completely into the threaded bore of a side rail segment, one half of the length of the stud extends beyond and lateral to the end of the assembly stud receiver—as well as the end of the side rail segment proximal thereto—. The one half length of the stud extending from the segment into which it has been affixed, when threaded into the threaded central bore within a second side rail segment, joins both segments in a solid butt joint. As discussed in more detail, below, the number and the length of individual side rail segments affixed to one another in this manner can be calculated to provide the four side rails utilized in the carrier of the present invention demonstrating virtually any desired and useable custom length.

The term "assembly stud" as utilized herein and the term "assembly set screw" have equal meaning and refer to the threaded fastener utilized to affix individual side rail segments to one another. It is preferred to form such fasteners to incorporate a drive recess at the ends thereof, configured as a hex, torque, phillips or other such drive to assist rotation of the set screws into the threaded bore of the below described assembly stud receiver. Incorporation of such a drive enables the use of powered drivers such as, for example, cordless drills to drive such set screws into individual segments as well as driving an entire assembled side rail into, for example, an aft rail end.

The assembly stud receivers within the side rail segments are shaped and configured to include a hub with a threaded central bore. The bore demonstrates a depth—a length in which the assembly stud can be seated—. The threaded bore is positioned in longitudinal alignment with the longitudinal axis of the segment. In the preferred embodiment of the present invention, the depth of the threaded central bore is selected to be equal to one half the length of the side rail segment assembly stud. It can also be described as selecting an assembly stud that demonstrates a length twice that of the depth of the threaded central bore.

The primary crossbars (as well as the supplemental crossbars) of the present invention demonstrate a length, an upper surface—which may also be referred to as a top surface, a lower surface (which may also be referred to as a bottom surface) and two ends. Once mounted upon a vehicle, the ends of the cross bars may also be referred to as a right end and a left end. The ends of the crossbars are especially shaped and configured to mate with and engage an inboard portion of a side rail coupler/crossbar adapter or a side rail cross bar adapter. The lower surface of the crossbar is configured and adapted for engagement and attachment to a mounting base which affixes the bar (and, in turn, the entire carrier), to a roof mounting feature such as, for example, a vehicle roof's mounting groove or flange. In preferred embodiments of the present invention, the crossbar includes a central groove running the complete length of the bar along the lower surface for capture therewithin of an assembly bolt for affixation to the mounting base so as to allow ease of positioning of the mounting base. Optionally, the crossbar may also include a central groove running along the upper surface as well. The term "primary crossbar" as utilized throughout this specification and claims refers to those crossbars which are affixed to both the upper and lower right and left side rails by means of a side bar coupler/crossbar adapter. The primary crossbars are also utilized, as described below, for attachment of the carrier, via a mounting base, to a vehicle roof. In contrast, a "supplemental crossbar", which is an optional element, is affixed to the lower right and left side rails only and it is so attached by means of a side rail crossbar adapter. The supplemental crossbar may also, optionally, be attached to a mounting base for additional carrier support. There is no structural difference between a primary crossbar and a supplemental crossbar. The only difference between the two is the manner in which they are affixed to the side bars. Both crossbars can utilize a mounting base for affixation of the carrier to a vehicle roof.

The roof mounting bases of the present invention demonstrate an upper portion as well as a lower portion. The upper portion of the mounting base is especially shaped and configured to engage and be affixed to a crossbar while the lower portion of the mounting base being configured for engagement of a vehicle roof mounting feature such as, for example, a flange or groove in the usual manner.

The side rail coupler/crossbar adapters of the present invention are shaped and configured to demonstrate an inboard surface, an outboard surface, an upper portion and a lower portion. The upper portion of the adapter includes an upper hollow tubular bore as well as a lower hollow tubular bore, each such hollow tubular bores defining a longitudinal axis running the length thereof and being vertically aligned with one another. More specifically, the upper and lower hollow tubular bores are positioned in vertical alignment with each other with the openings to each bore facing fore and aft when the carrier is mounted to a vehicle. The lower part of the inboard portion of the side rail coupler/crossbar adapter is especially configured and adapted to mate and engage with a right or left end of the crossbar. The upper and lower hollow tubular bores are adapted for passage therethrough of an upper side rail and a lower side rail, respectively. Since the upper and lower hollow tubular bores of the adapter are vertically aligned, upper and lower side rails positioned therewithin are also held in vertical alignment. A tightening plate, discussed in detail below, is located between the upper and lower hollow tubular bores and enables said bores to be reduced in dimension so as to firmly affix the side rails positioned therewithin firmly in place. Prior to securing the side rails by means of screws which pass through and "tighten" the tightening plate, the side rails which are within the hollow bores of the side rail coupler/crossbar adapter are held in a relatively loose manner so as to allow rotation (discussed in more detail, below.)

When the carrier of the present invention incorporates supplemental cross bars, the side rail crossbar adapter is utilized to attach such optional crossbars to the side rails. The side rail crossbar adapter differs from the side rail coupler/crossbar adapter in that it does not attach to both, and thereby couple the upper and lower right and left side rails. It is affixed to the lower side rails only. The side rail crossbar adapter includes an inboard portion which is especially shaped and configured to mate with and be affixed to the right or left end of a crossbar. This adapter also includes an upper curved portion disposed in a relatively outboard position when mounted. The upper curved portion is especially shaped and configured to overlie and closely conform to the radial shape of an upper portion of a lower side rail for mounting of the adapter, and the bar to which it will be attached, thereupon. A side rail crossbar mounting plate, which is especially configured to conform to a lower portion of a lower side rail and be affixed to the curved portion of the side rail crossbar adapter, is used to securely affix the adapter to the lower side rail as well as the crossbar to which the adapter it is attached.

Preferred embodiments of the present invention utilize four rail ends in order to further join and strengthen two vertically aligned side rails located on the left and right side of the carrier at the fore and aft terminus of such side rails. In alternate preferred embodiments of the present invention, accessory mount bars—which may be referred to with equal meaning as "accessory bars", are specifically configured for attachment to the fore and aft ends of the side rails are provided. As mentioned above, the cargo carrier of the present invention may optionally include rail ends which serve to provide further connection and stabilization of the vertically aligned left and right upper and lower side rails at the aft and fore termini thereof. Accessory mount bars provide this same function, along with other utility such as, for example, providing a site for mounting auxiliary lighting, air deflectors or cargo loading assist bars. In certain preferred embodiments of the present invention, the accessory mount bars include left and right termini (which may also be referred to, with equal meaning as right and left ends), which, in a similar manner as rail ends, are shaped and configured in a U like shape. "U like" shape is utilized in this specification and throughout the claims to describe the general shape of the rail ends as well as the ends of the for and aft accessory mount bars being formed in a shape, similar, but not exactly as the letter U. In fact, the ends of accessory mount bars are shaped and configured in the same manner and form as the rail ends including duplicating the same superior and inferior assembly bores, so as to enable quick and stable attachment of such accessories to the fore or aft ends of the right and left vertically aligned side rails—in the same manner as provided by the fore and aft rail ends. In regard to certain alternate forms of the accessory bars, a specialized adapter, as described below, is utilized.

The rail ends of the present invention are formed in what can best be described as a U-like shape. Each rail end has a superior and inferior end which are oriented in the same direction as discussed, in more detail, below. Each such rail end is especially configured and adapted to engage and be affixed to two vertically aligned left and two vertically aligned right upper and lower side rail which are, in turn disposed in vertical alignment by means of the side rail coupler/crossbar adapter. Rail ends of the present invention are shaped and configured as either fore and aft rail ends, as discussed in much more detail, below.

In an alternate preferred embodiment of the present invention, the side rail segments of the preferred embodiment of the present invention, and the side rails assembled therefrom, are disclosed, separate and apart from their integration within the vehicular roof top cargo carrier of the present invention. The side rail segments and side rails of the alternate embodiment may be advantageously integrated and utilized within virtually any vehicular roof top carrier. Simply put, the side rail segments of the present invention, formed as round tubes, produced in assorted lengths and having two centrally located assembly stud receivers located therewithin positioned proximal to the fore and aft termini—as described more fully, and in great detail above and below—, provide an advantageous improvement when integrated within any vehicular roof top carrier utilizing side rails of the prior art. Integration of the side rails disclosed herein within such carriers affords such devices the increased strength, ease of assembly, and ability to produce a carrier of virtually any desired fore/aft length provided by the side rails utilized within the custom roof top vehicular carrier kit—the preferred embodiment of the present invention—.

As disclosed above and below (in regard to the preferred embodiment of the present invention), the right and left side rails comprise a pair of vertically aligned side rails. For this purpose, in the preferred embodiment of the present invention, the aforementioned side rail coupler/crossbar adapter is utilized to couple the upper and lower left and right side rails whereas a side rail adapter is utilized to affix supplemental cross bars to a single, preferably lower side rail without a coupling function. In regard to the alternate embodiment of the present invention wherein the disclosed side rails —being designed, configured, constructed and assembled in the same manner as within the preferred embodiment—are utilized in applications wherein, for example: only a single left and single right side rail are incorporated into a carrier; two or more vertically aligned side bars are incorporated into a carrier; crossbars are incorporated into a carrier; and in configurations wherein a platform is incorporated into the carrier. Vehicular roof top cargo carriers utilizing a single left and right side rail in accordance with alternate embodiment of the present invention may be highly advantageous in providing a carrier with a lower profile—a reduced height above the vehicular roof to which the side rails are affixed—. When greater height above a vehicle roof is an advantageous feature of a vehicular roof top carrier—resulting in greater contained carrier volume and increased cargo retention, it is contemplated that two or more vertically aligned side rails can provide such utility. Vehicular roof top platforms may also incorporate the side rails disclosed by the alternate embodiment of the present invention. Each of the aforementioned roof top carrier and platforms gains the improved strength, ease of assembly and custom fore/aft length afforded by the side rail segment and side rails assembled thereby disclosed herein.

In incorporating the side rail segments and side rails of the alternate embodiment into roof top carriers—other than the preferred custom cargo carrier disclosed herein—a means of securing such side rails, directly or indirectly, to a vehicle roof is required. If such side rails are utilized to support, for example, crossbars or platforms, a means of doing such is also required. In regard to securing the side rails of the alternate embodiment to a prior art carrier, platform, and/or vehicle roof, it is highly preferred, but not essential, that the adapter or bracket utilized to do so enables the side rail segments and side rails assembled therefrom to freely rotate therewithin—as described herein in regard to the custom vehicular roof top cargo carrier kit—, prior to final assembly of a complete side rail from such segments. More specifically, it is especially preferred that such an adapter advantageously secures the disclosed side rails to a vehicular roof in such a manner as to enable the side bars to freely rotate within such adapters which may also be referred to herein, with equal meaning, as side rail brackets. Such free rotation enables, as discussed below, quick and easy assembly of side rail segments via rotation within such brackets. After such assembly is complete, such brackets may be tightened to firmly secure the side rails into position. In regard to carriers that incorporate a single right and single left side rail, it is advantageous but not required that the adapter/bracket utilized rotatably affixes each side rail to a vehicle roof. In regard to applications where multiple vertically aligned side rails are utilized, such brackets may also be referred to as coupler/adapters which couple such vertically aligned side rails while also affixing the rails to a vehicle roof. It is likewise advantageous, but not required that such coupler/adapters allow the side rails to freely rotate therewithin until after the side rail segments contained by such are fully assembled. Thereafter, the coupler/adapters may be tightened to fully fix the side rails in position. In regard to carriers which incorporate crossbars or platforms, such brackets may also advantageously provide a means for affixing cross bars or platforms to the side rails.

It is also contemplated that in certain applications, the means for mounting the side rails of the alternate embodiment of the present invention to a vehicle may not allow the side rails and side rail segments to rotate with such mounting means. For example, certain side rail mounts may simply utilize a machine screw or other fasteners to engage a threaded bore formed through a wall of a side rail segment. In other instances, two bores formed 180 degrees apart from one another may be utilized to allow a bolt or machine screw, which is passed through a bore within a side rail mount, to pass completely through a portion of a side rail adjacent the mount and thereafter utilize a washer and nut to secure the side rail to the mount. In such instances, the side rail segments are assembled, as described above, prior to mounting the rails to a vehicle roof.

12c is a top right isometric view of a side rail coupler/crossbar adapter, mounting base, side rails and crossbar in accordance with the present invention.

Figure 13A:
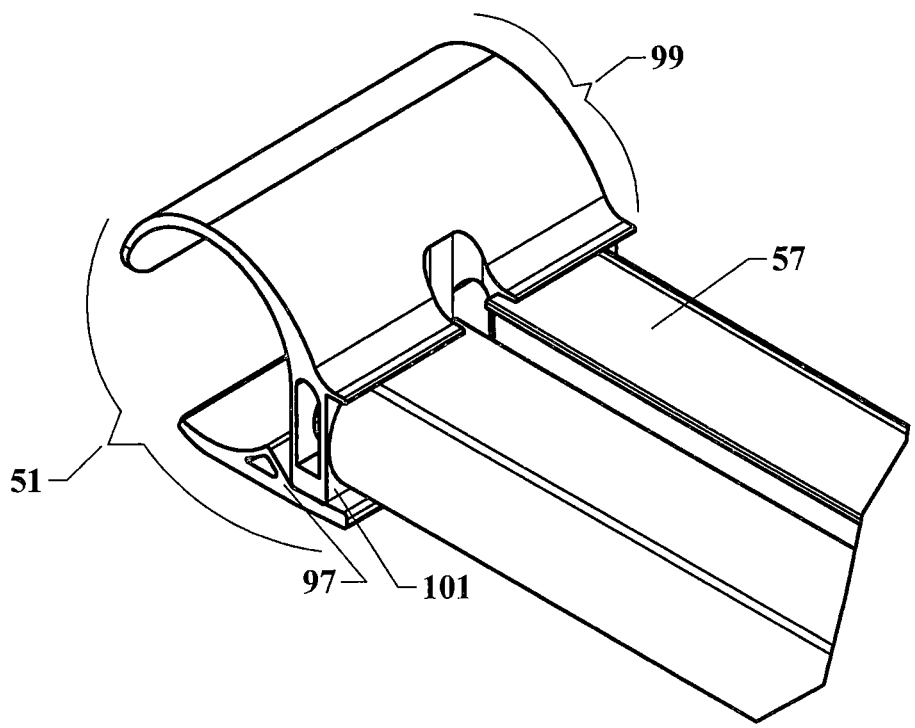

FIG. 13a is a top right isometric view of a side rail crossbar adapter and crossbar (sectional) of the present invention.

Figure 13B:
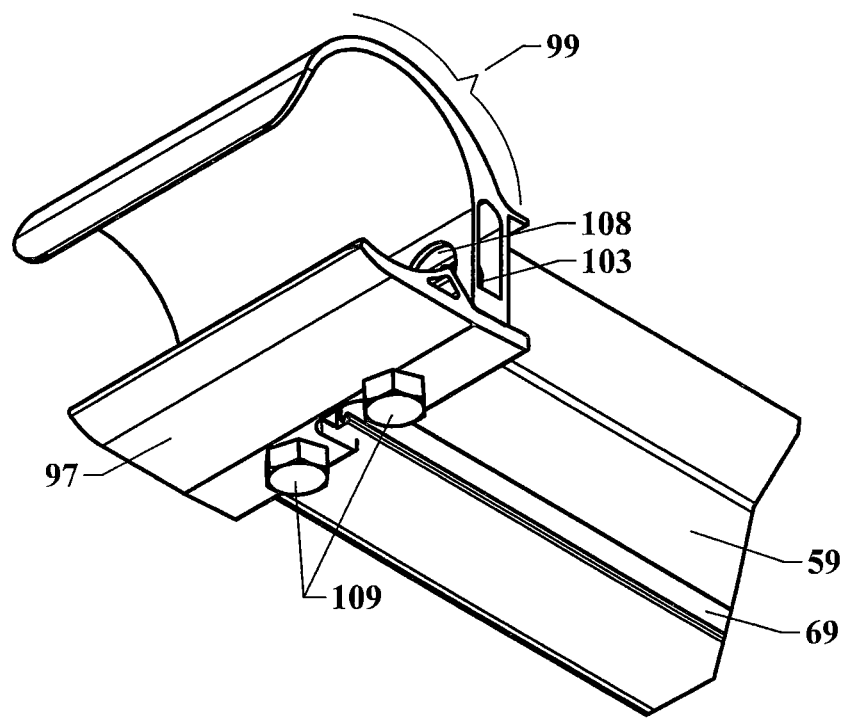

FIG. 13b is a bottom right isometric view of the side rail crossbar adapter and crossbar (sectional) illustrated in FIG. 13a.

Figure 14A:
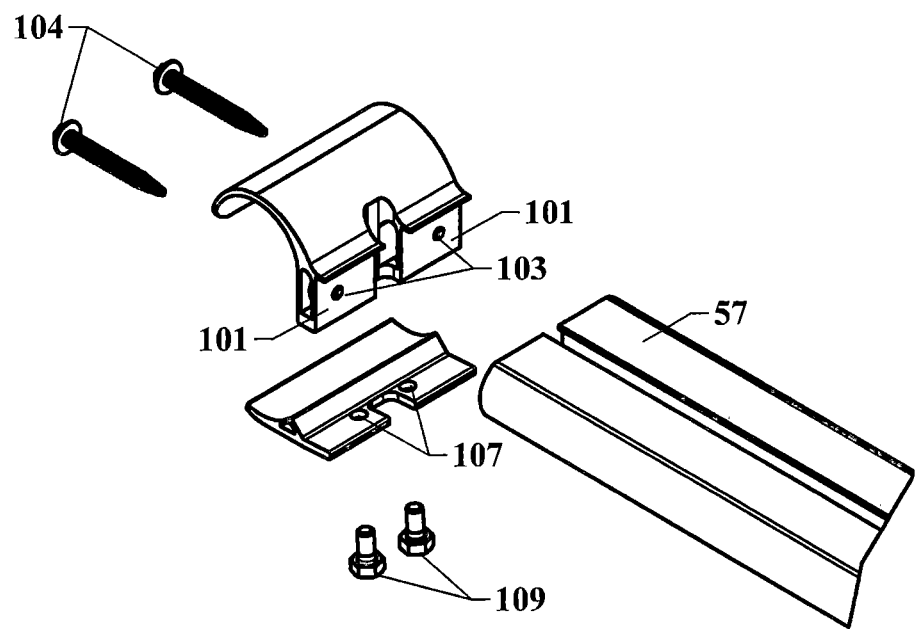

FIG. 14a is a top right isometric exploded view of the side rail crossbar adapter and crossbar illustrated in FIG. 13a.

Figure 14B:
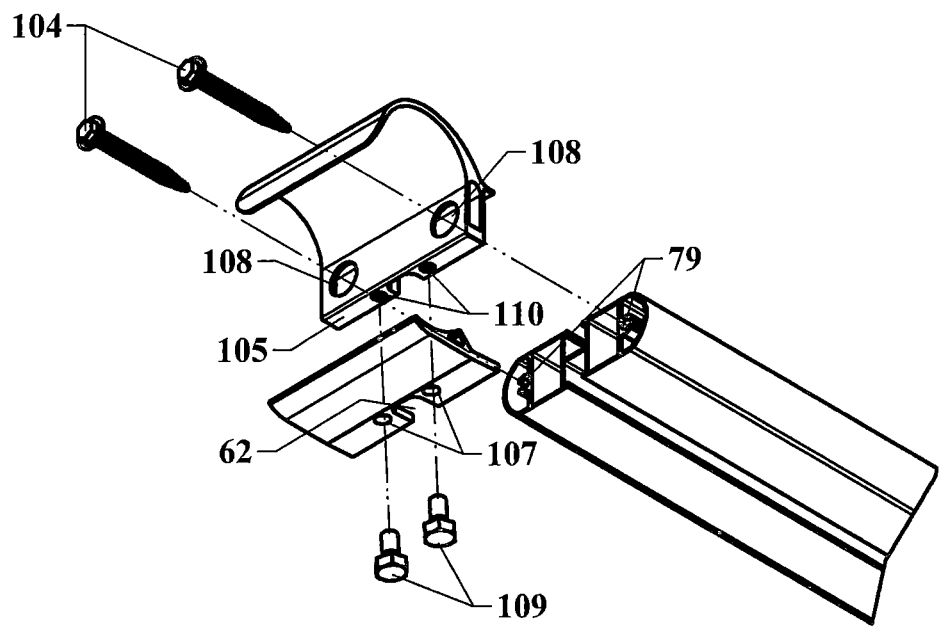

FIG. 14b is an exploded bottom right isometric view of the side rail crossbar adapter and crossbar illustrated in FIG. 13a.

FIG. 15a is a top left isometric sectional view of a fore rail end and side rails of the present invention.

Figure 15B:
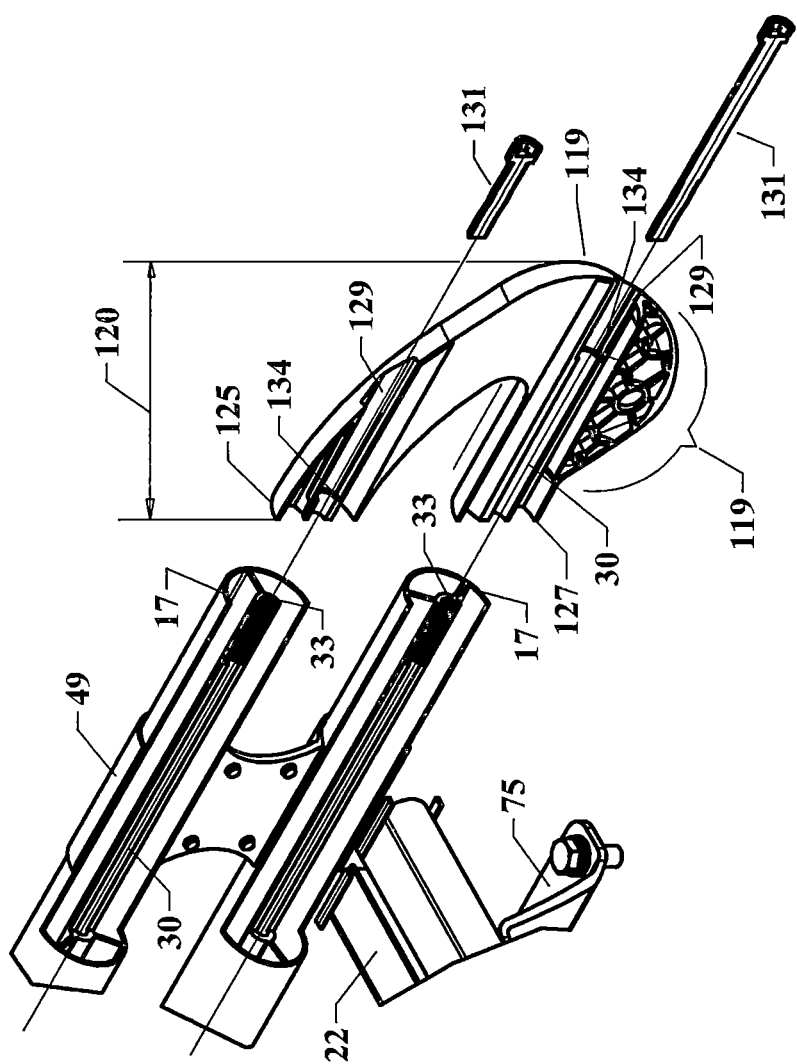

FIG. 15b is a top right isometric sectional view of a fore rail end and side rails of the present invention.

FIG. 16a is a top right isometric exploded view of a cargo carrier of the present invention with fore and aft accessories illustrated with sectional fore engagement end detail.

Figure 16B:
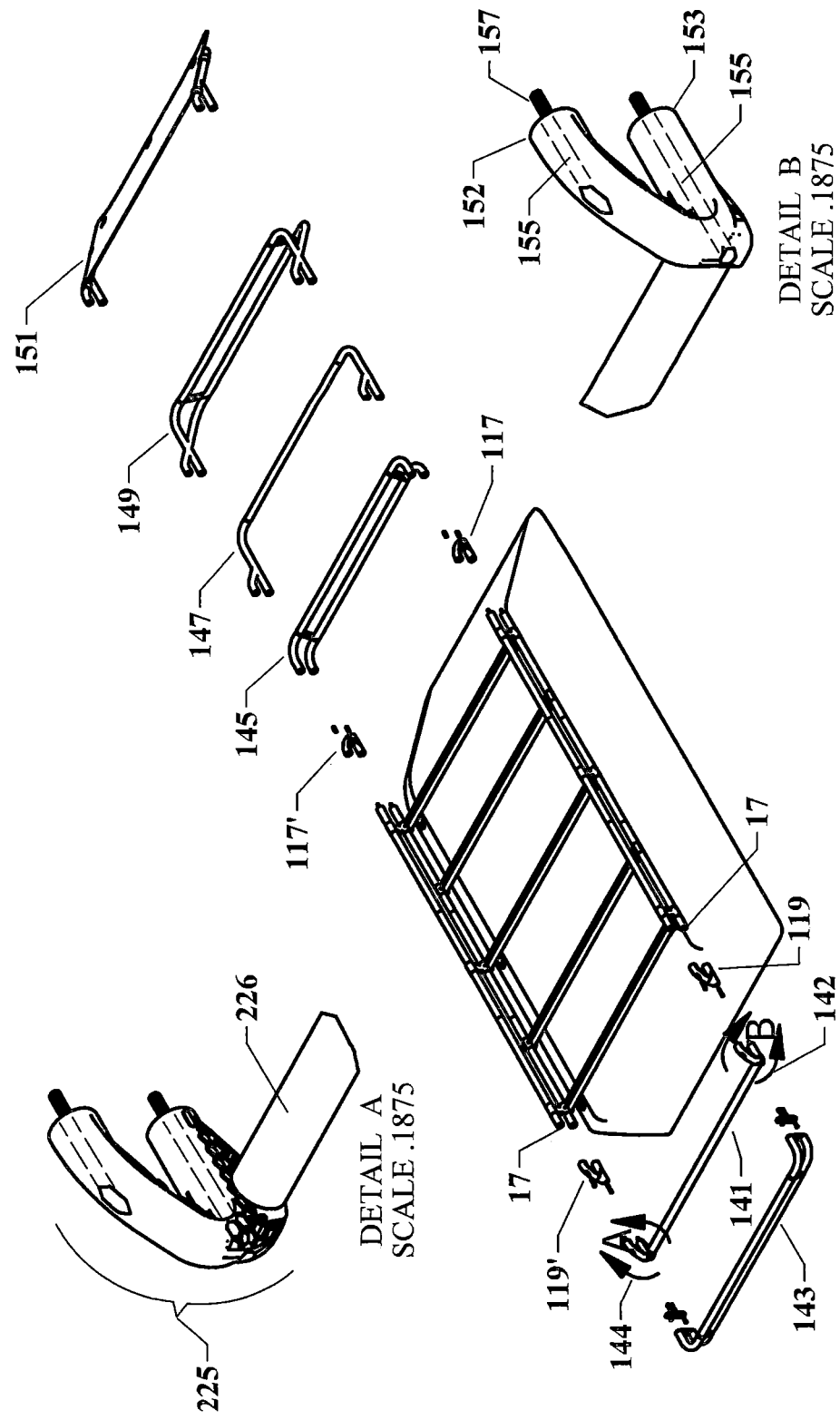

FIG. 16b is a top left isometric exploded view of a cargo carrier of the present invention with fore and aft accessories illustrated with sectional fore engagement end detail.

FIGS. 17-21 presents "Table 1"

Figure 22:
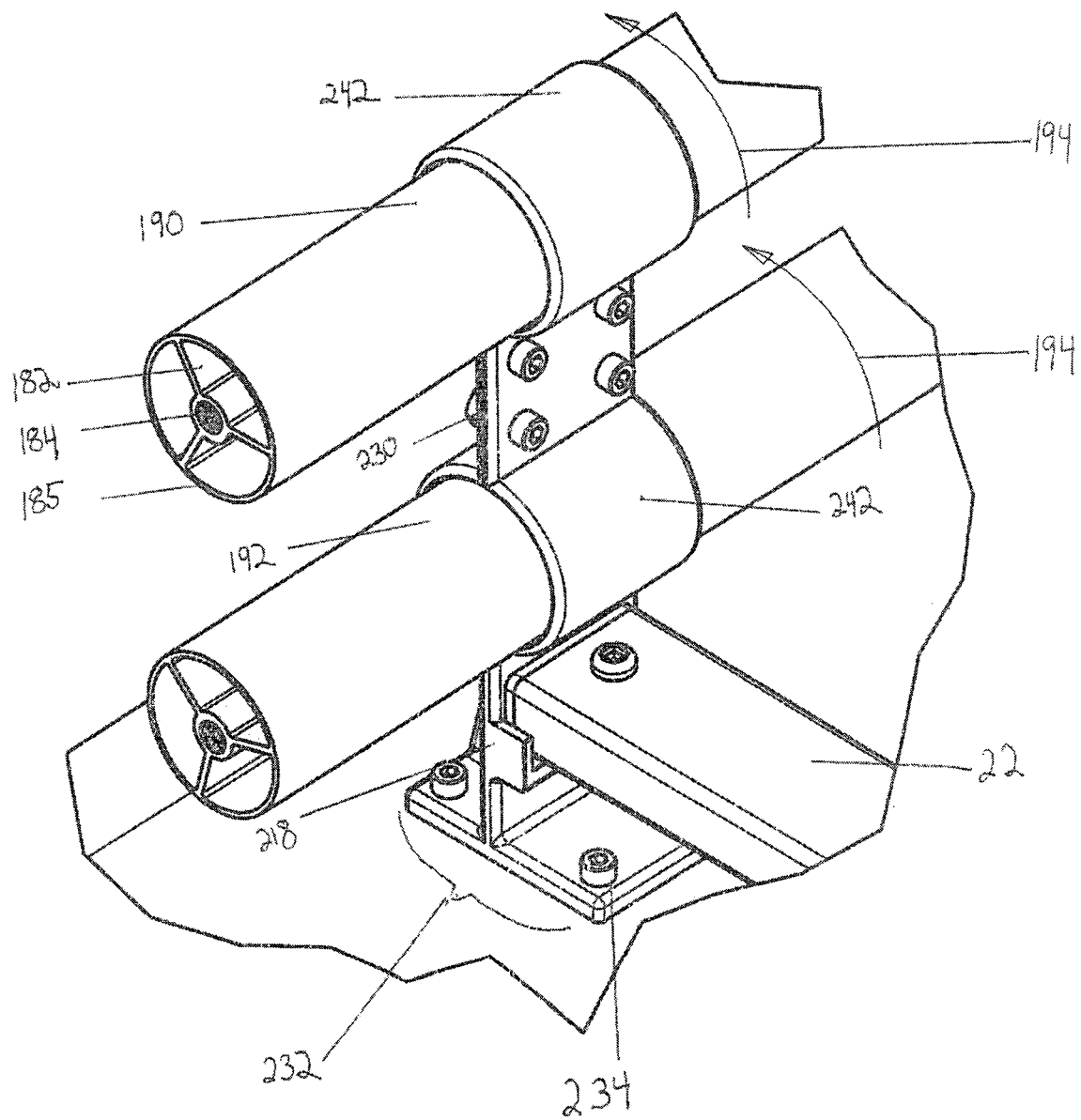

FIG. 22 is a top left sectional isometric view of two vertically aligned side rails of the alternate preferred embodiment of the present invention mounted to the roof of a vehicle.

Figure 23:
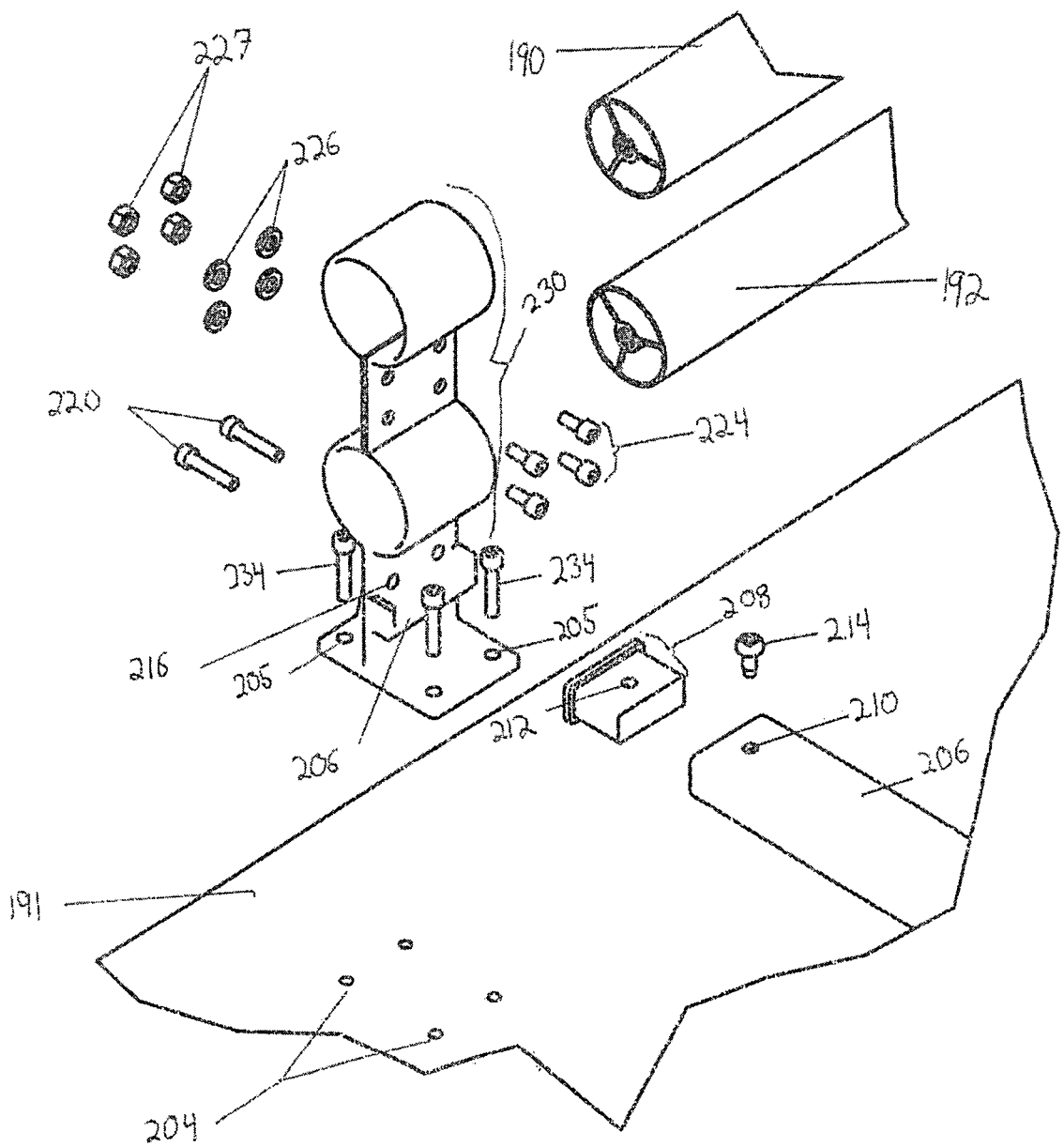

FIG. 23 is an exploded view of the side rails illustrated in FIG. 22.

Figure 24:
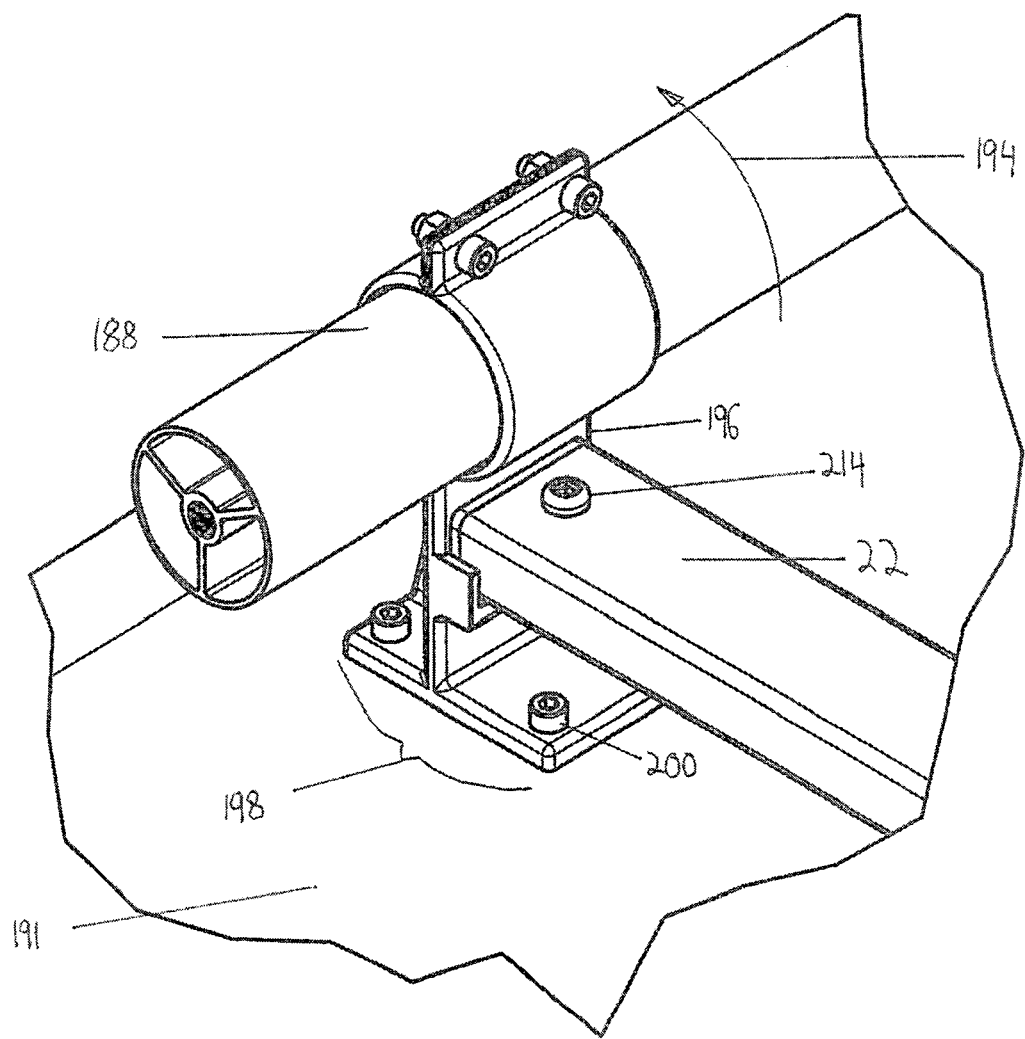

FIG. 24 is a top left sectional isometric view of a side rail of the alternate preferred embodiment of the present invention mounted to roof of a vehicle.

Figure 25:
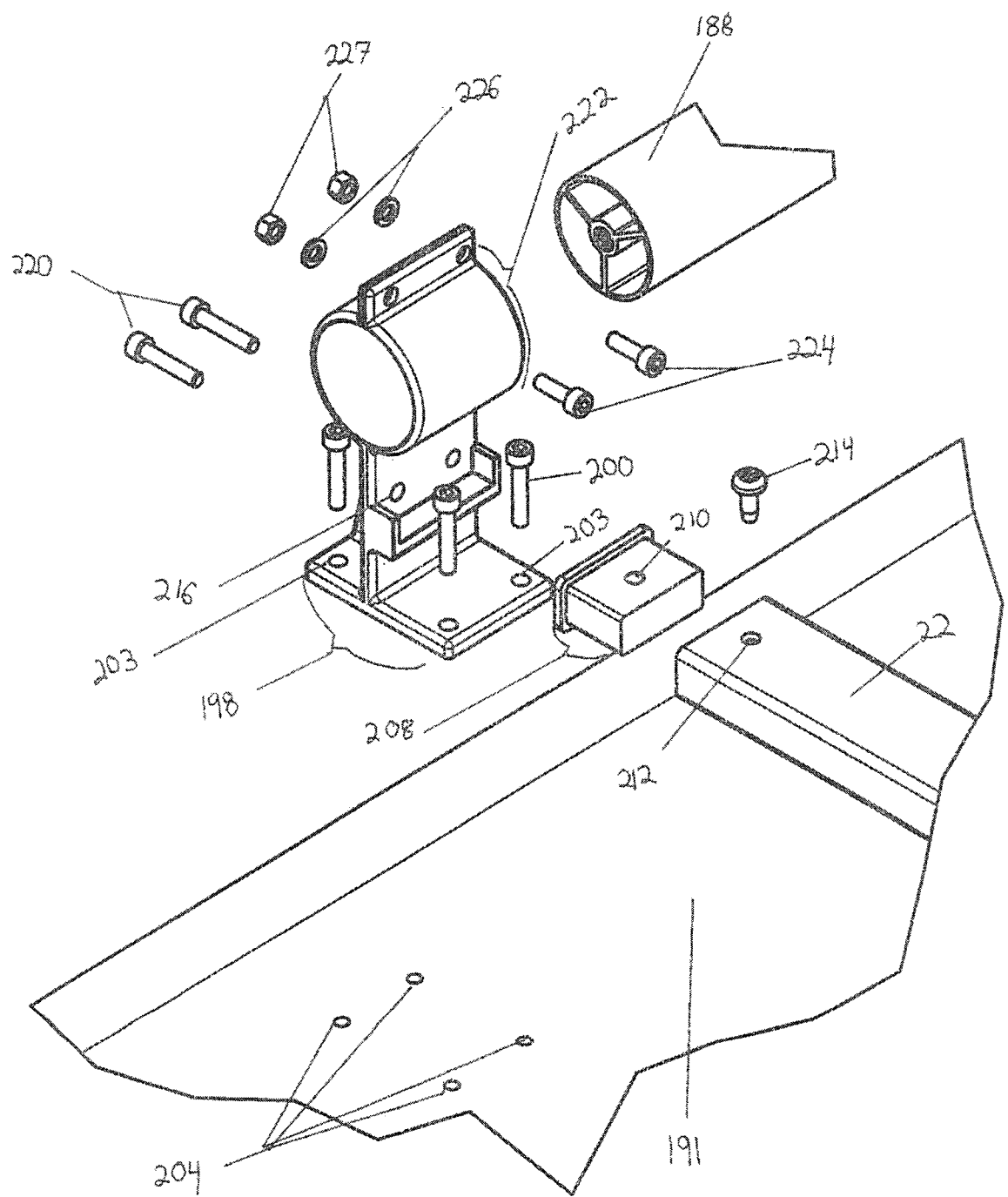

FIG. 25 is an exploded view of the side rail illustrated in FIG. 24.

DETAILED DESCRIPTION

Figure 1:
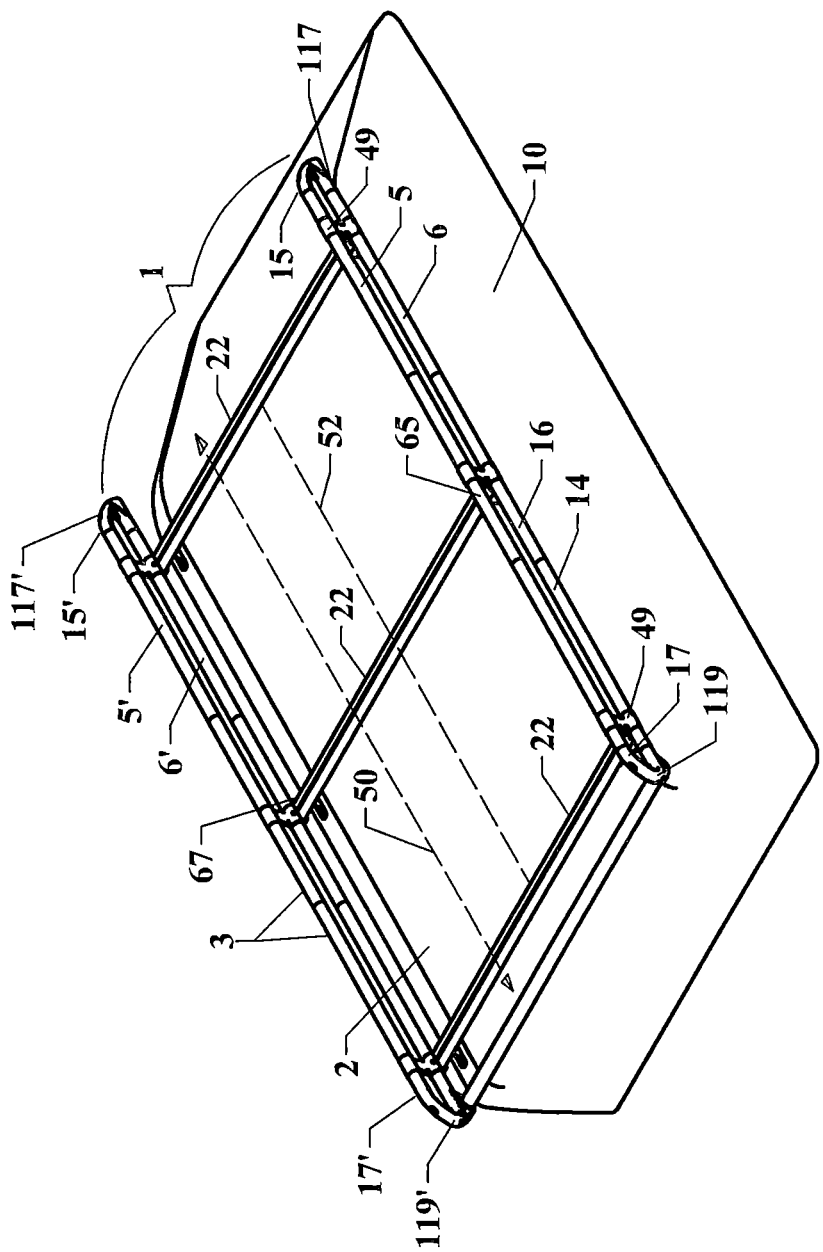
FIG. 1 is a top right isometric view of a preferred embodiment of the roof top cargo carrier of the present invention.
Figure 2:
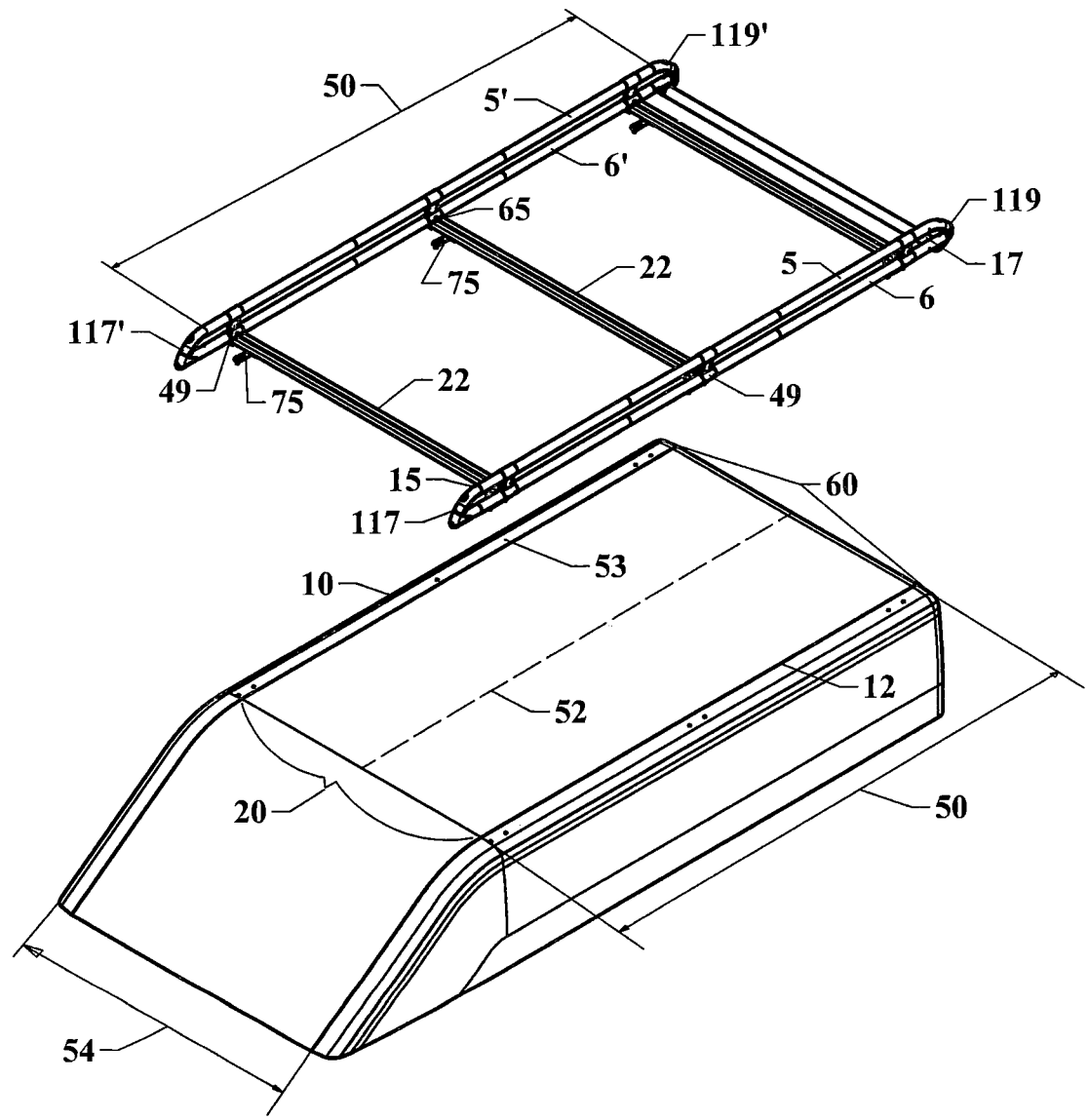
FIG. 2 is a top left isometric exploded view of the cargo carrier embodiment illustrated in FIG. 1.
Figure 3:
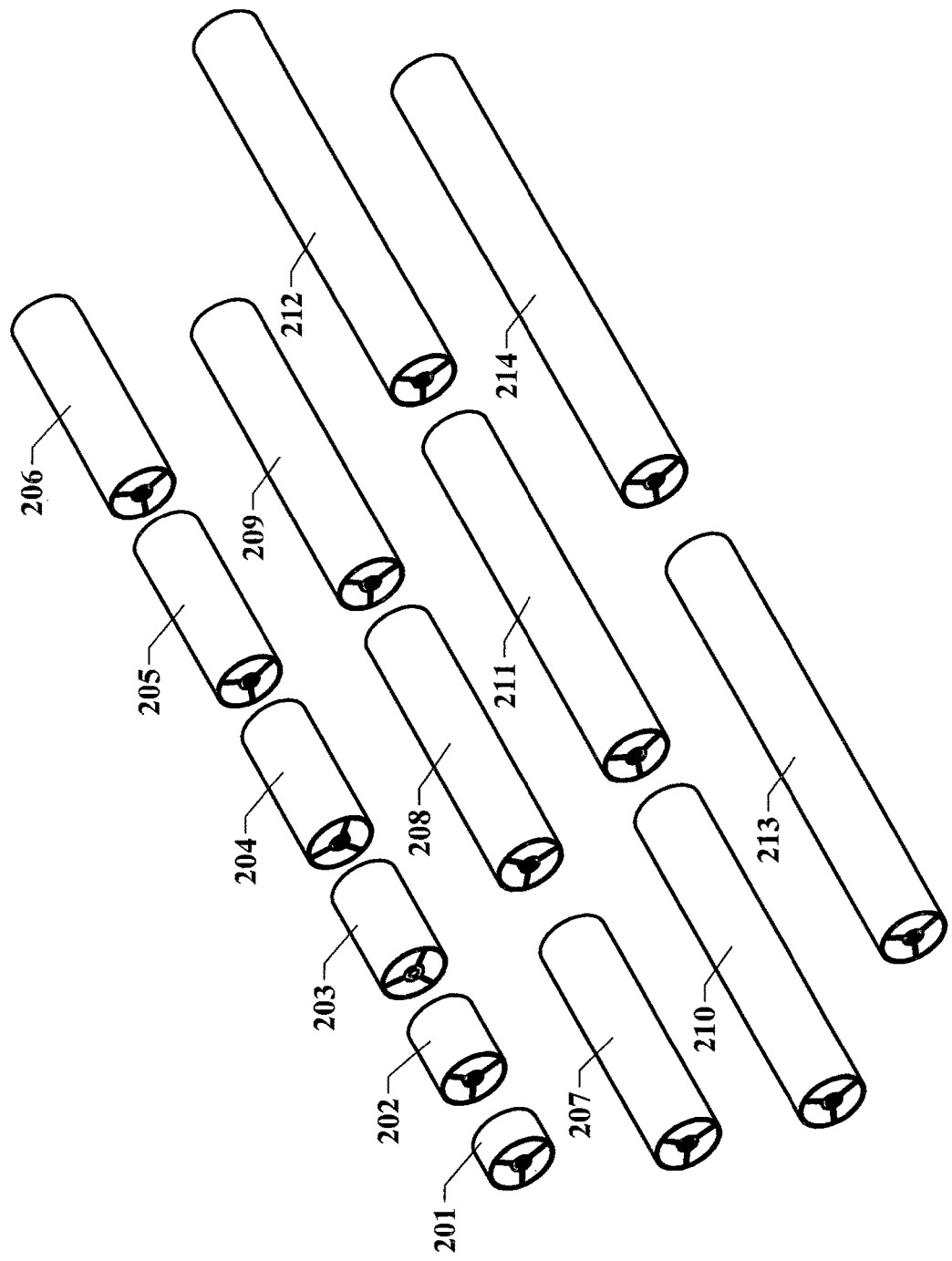
FIG. 3 is a top right isometric view of the small side rail segments in accordance with the present invention.
Figure 4:
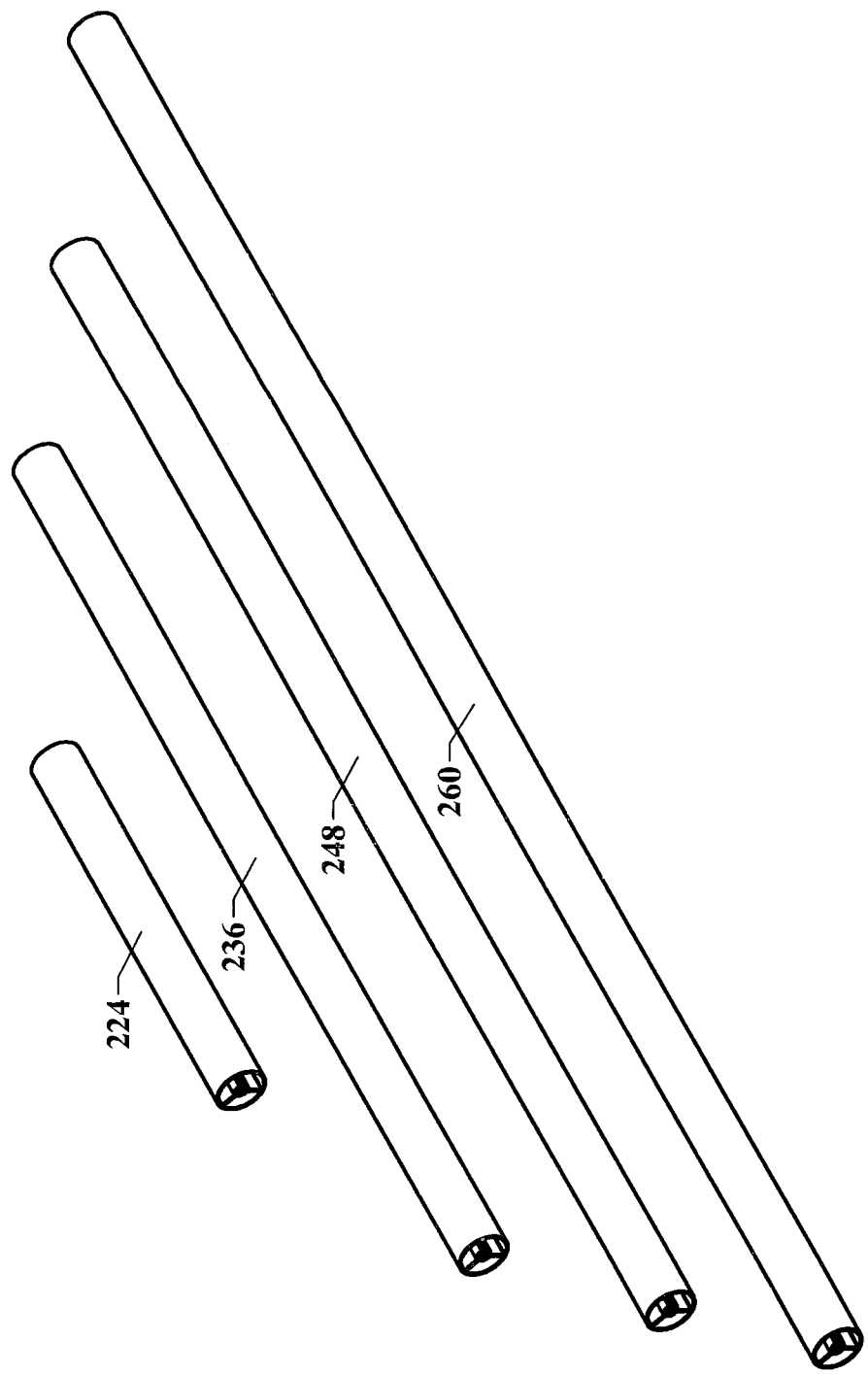
FIG. 4 is a top right isometric view of large side rail segments in accordance with the present invention.
Figure 5:
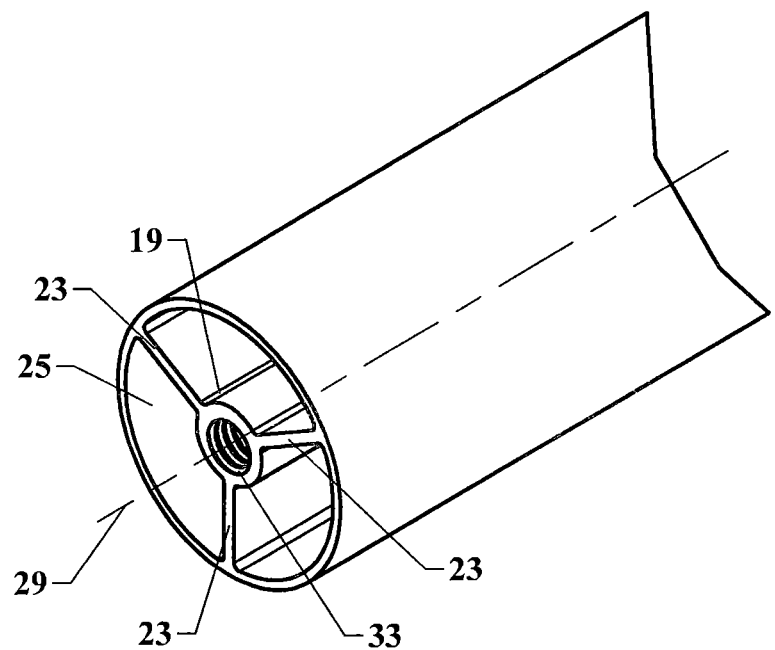
FIG. 5 is a to right view of a portion of a side rail segment in accordance with the present invention.
Figure 6:
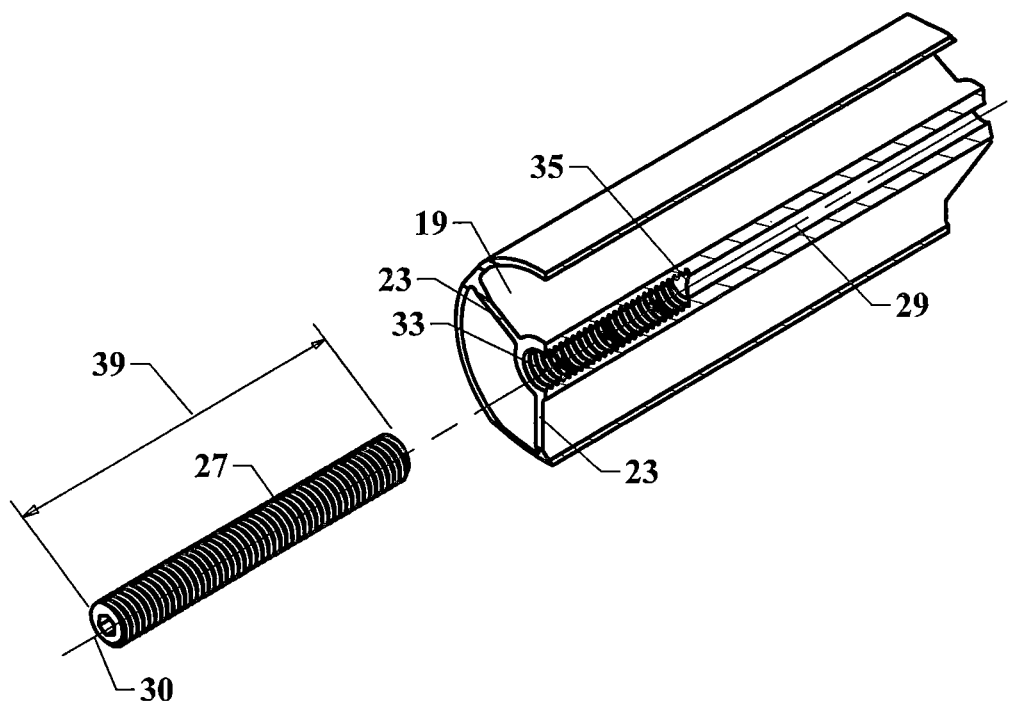
FIG. 6 is a top right sectional view of the a side rail segment in accordance with the present invention.
Figure 7:
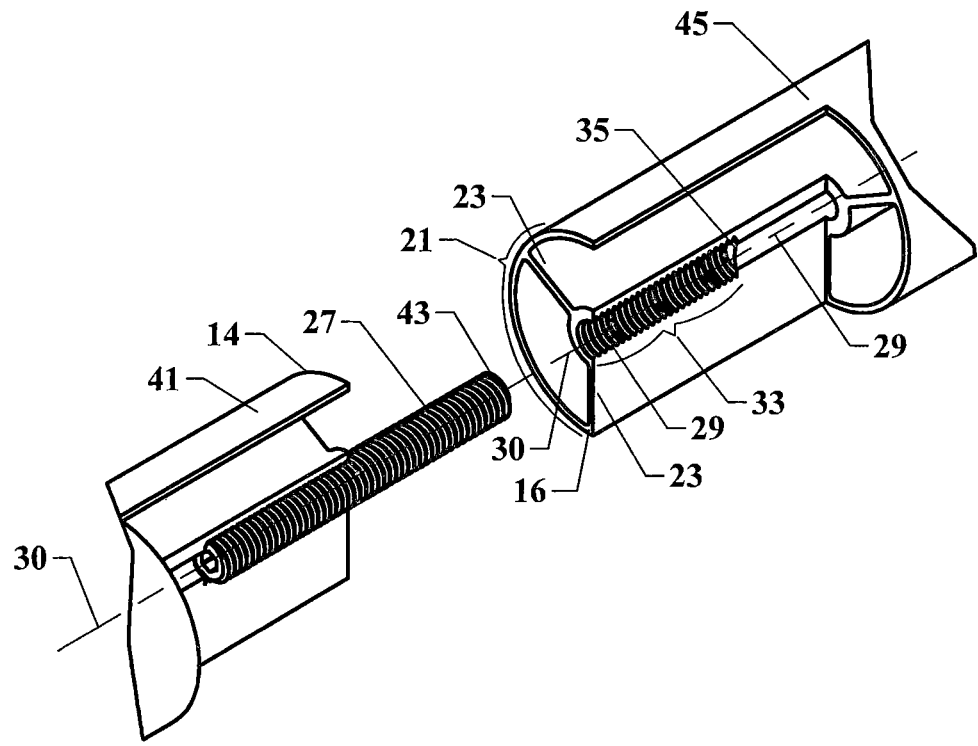
FIG. 7 is a top right sectional view of two side rails in accordance with the present invention.
Figure 8:
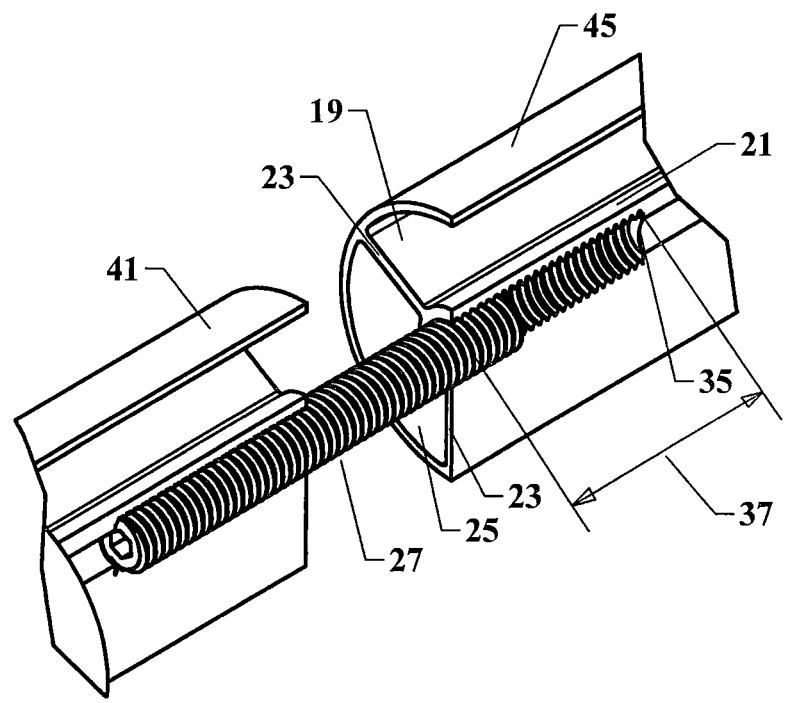
FIG. 8 is a top right sectional view of partially assembled side rails in accordance with the present invention.
Figure 9:
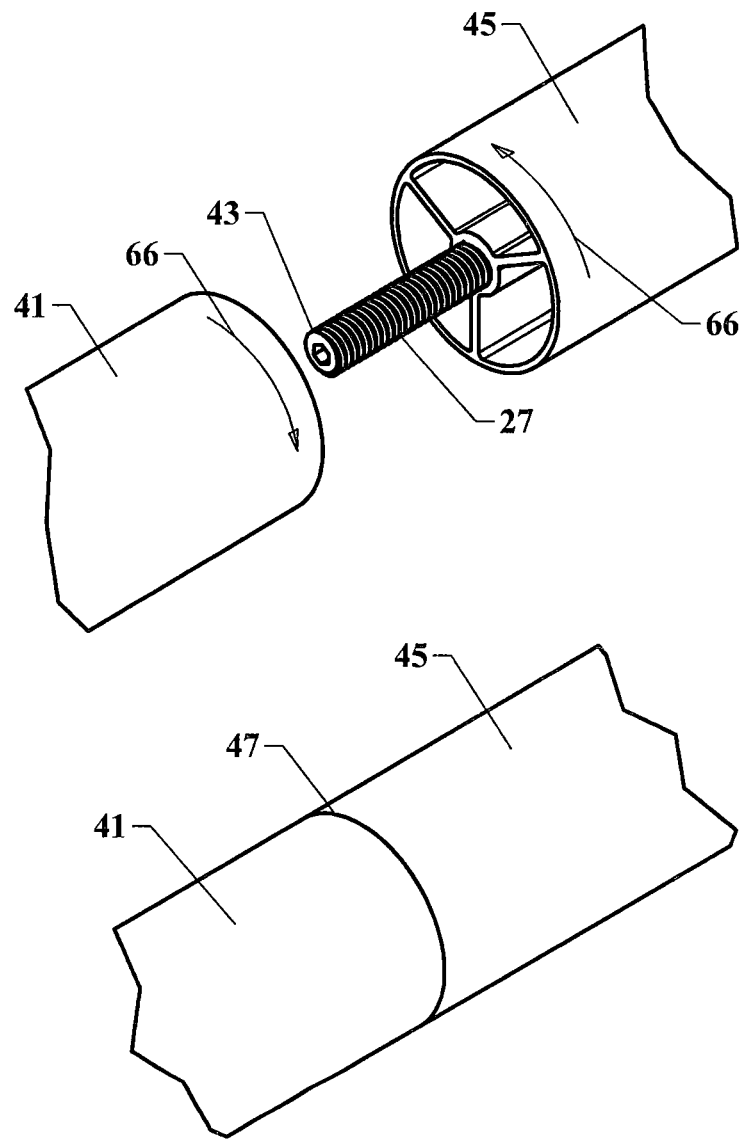
FIG. 9 is a top right isometric view of the assembly of two side rail segments of the present invention.

As stated above, and, as illustrated in FIGS. 1-2, the custom roof top cargo carrier 1 of the present invention utilizes an assortment of side rail segments 3 demonstrating a range of predetermined lengths that are joined together to form a right and left, side rail 5/6 and 5'/6' upper and lower side bars of a custom and desired length. The term "range of predetermined length" refers to side rail segments provided in specific lengths ranging from a diminutive length, e.g. 1 inch up to about 60 inches in length. As shown in FIG. 3, these segments are provided in a shorter length group as well as a larger length group illustrated in FIG. 4. More specifically, in certain preferred embodiments, the shorter group illustrated within FIG. 3 may include, for example, segments of 1, 2, 3, 4, 5, 6, 7, 8, 9, 10, 11, 13 and 14 inches as shown by reference numbers 201, 202. 203, 204, 205, 206, 207, 208, 209, 210, 211, 212, 213 and 214 respectively. The longer segment group, as illustrated in FIG. 4, has a range running from about 12 inches to about 60 inches and includes, in a preferred embodiment, segments of 12, 24, 36, 48 and 60 inches as shown by reference numbers 212, 224, 236 248 and 260, respectively. The 12 inch segment is illustrated in FIG. 3. However, the illustrated segment predetermined size range may be expanded or diminished in certain embodiments where the assembled rail size requires such. The shorter segments allow finer adjustment of the overall length of a side rail. In addition the segments may be configured in metric lengths as well as imperial so long as there is a shorter and longer group to provide the same purpose of allowing "fine tuning" of overall side rail, and thus carrier length. In addition, in certain alternate preferred embodiments, side rail segments are provided that are especially configured so as to enable such segments to be custom cut to a desired length. Provision of such segments capable of being cut to a desired length or the provision of extremely short segments of 1, 2 and 3 inches, in combination with the provision of other segments provided in a plurality of lengths enables assembly of a roof top carrier of a truly custom (fore/aft) length. For that purpose, segments designed for a custom length cut include assembly stud receiver running the entire length of the segment so that, regardless of where the side rail segment is cut, an assembly stud receiver is located adjacent to both the fore and aft end thereof.

As shown in FIG. 1 and FIG. 2, the side rail segments of the present inventions are especially designed and configured so that joining a selected plurality of segments provides two left 5' and 6' and two right 5 and 6 vertically aligned side rails when mounted upon a vehicle of a desired fore/aft length. The central, longitudinally aligned threaded bores of adjacent side rail segments, which are joined via an assembly bolt to form a powerful butt joint, is highly resistant to flexing, compressive, shearing and bending forces. (See FIGS. 5 through 9). The present invention provides a modular vehicular roof top cargo carrier, or, as it may also be referred to, with equal meaning, a vehicular roof top cargo carrier kit which provides side rail segments in various lengths. For example, the vehicular cargo carrier kit may include one or more pairs of 24", 36", 48" and 60" (or their approximate metric equivalent lengths) rail segments which can be joined together, in any combination, to form one or, for example, a pair of left and right side rail—so long as the total length of the right and left side pair of side rails are equal. Further customization of the side rail, and thus carrier length, can be achieved by selecting shorter side rail segment for incorporation into the assembled right and left side rail(s). Such "shorter" segments can also be combined with the aforementioned larger segments to achieve still further customization. Throughout this specification and claims, the term "shorter" side rail segment refers to side rails having a length running from about 1 inch (or about 3 cm to about (35 cm). For example, preferred embodiments of such modular roof top carrier kits may include side rail segments demonstrating a length of 1"-11, in one inch increments and a 13 and 14 inch segment, a shorter segment group, and a longer segment group running from 12 to 60 inches, as described in detail, below. Such kits, of course, would enable custom side rails to be assembled to the closest inch of a desired side rail length.

Table 1, as shown in FIG. 17 through 21, demonstrates the manner in which selected rails demonstrating a range of predetermined lengths, can be combined to provide a desired custom length. By combining any one or more of the longer (36, 48 and 60 inch) side rails with, if required to achieve a desired overall length, any one or more of the shorter (1 to 11 and 13 to 14 inches) side rail segments side rail length can be configured from as short as 15 inches to as long as desired—to the inch—. It is preferred that the range of predetermined length of the side rail segments is from about 1 inch to about 60 inches. It is still further preferred that range of predetermined length includes a range of "shorter segments" running from about 1 inch to about 11, & about 13 to 14 inches and a selection of longer segment demonstrating a length of "12, 24, 36, 48 and 60" inches. The segments illustrated in Table 1 can be combined to cover the entire size range illustrated with the least required number of individual side rail segments and thus a reduction in required segment to segment butt joints. This, of course, makes assembly of the segments into side rails more rapid and efficient. When the modular roof top carrier kit is configured in metric sizing, a roughly comparable range of segments may also be provided. For example, the shorter segment lengths will be in metric equivalents running from 3 cm to about 35.5 centimeters and the longer length segments will include segments of about 30 to about 152 centimeters with equivalent intervening sizes. For example, in one embodiment of the present invention, the shorter length segments would include a 3 cm, 5.5 cm, 8 cm, 10.5 cm, 13 cm, 15.5 cm, 18 cm, 20.5 cm, 23 cm, 25.5 cm, 28 cm, 30.5 cm, 33 cm and 35.5 cm segments. Table 1, recites, for a give desired assembled Side Rail Length, the side rail segment selected (S1, S2, etc.) required to achieve such length.

The side rails of the preferred embodiment are assembled from side rail segments as vertically coupled pairs (mounted in vertical alignment) with an upper and lower right side rail 5/6 as well as an upper and lower left side rails 5'/6'. When mounted upon a vehicular roof top, a first pair of vertically coupled rails runs in a fore/aft direction along the right side of the vehicle's roof 10 with the second pair running in alignment with first along the left side 12. (See FIGS. 1-2) The side rail segments 3 are advantageously configured and shaped as round tubes having a terminus at each end thereof which may be referred to as a fore 14 and aft 16 end based upon the orientation of such side rail segments relative to their position on a vehicle roof top. It is preferred that the round tube configuration is a hollow tube, but solid tubes may also be selected. Selecting a round, tubular shape provides greater resistance to deformation under load and, most importantly, allows the placement of the segment connector—centered—along the longitudinal axis 30 of the segment where such connectors are less subject to lateral stress forces.

As illustrated in FIGS. 5 through 9, the side rail segments are especially configured to include, proximal to the fore 14 and aft 16 terminus of each such segment, an assembly stud receiver 19. The assembly stud receiver may be advantageously formed so as to include a hub 21, with a central bore 33 centered therewithin. In certain preferred embodiments, the hub is affixed, via 3 or more radial arms 23, to the inner walls 25 of each segment proximal to both ends thereof. Such mounting of the hub or, forming of the segments with such hubs as an integral part thereof, securely affixes the stud receiver to the side rail segment.

In certain preferred embodiments, an assembly stud 27 is utilized to affix the above-described segments to one another. For this purpose, the assembly stud receiver locates the hub at the longitudinal axis 29 of the side rail segments. The central bore in certain preferred embodiments, is formed, machined or otherwise configured to include threads so as to form a threaded central bore 33 that enable an assembly stud to matingly engage such threads. For example, in preferred embodiments of the present invention, the central bore of the hub is configured to demonstrate a diameter of ⅜ inch. In such embodiments, the bore is formed and/or machined to include threads that matingly engage a ⅜ inch assembly stud. The assembly stud receiver may be fabricated from a plastic, such as a polycarbonate plastic or a metal such as aluminum, steel or a steel alloy. Alternatively, the assembly stud receiver may be produced with radial arms 23 fabricated from a plastic polymer or reinforced plastic polymer and a central hub fabricated from any of the above-described metals and metal alloys. The assembly stud receiver may also include radial arms 23 and a central hub fabricated from a plastic polymer or a reinforced plastic polymer with the central bore fabricated from a metal or metal alloy. However, it is preferred that the assembly stud receiver be fabricated from an aluminum, steel or a steel alloy. In addition, the central hub may also be fabricated in any of the aforementioned metals with the central part thereof machine tapped to receive the assembly stud.

As stated above, the central bore of the hub is especially configured and adapted to include threads that mate with and securely retain an assembly stud. The threaded central bore 33 of the hub may advantageously include a stop 35 so as to limit the depth to which the below described assembly stud can be threaded into the assembly bolt receiver. In the preferred embodiment of the present invention, it is preferred that side rail segments incorporate a hub having a threaded central bore demonstrating a depth 37 equal to approximately ½ the length 39 of an assembly stud configured to mate therewith. Thus, for example, a 3 inch assembly stud may be utilized to join two side rail segments having stud receivers demonstrating 1.5 inch threaded bores formed within their central hubs. Thus, such 3 inch studs are capable of fully mating the ends of two such segment and in doing so join such two segments in a tight butt joint. Side rail segments of more diminutive lengths, such as, for example, three inches, require the use of shorter assembly studs such as, fore example, a 2 inch stud, while incorporating central bores having a threaded depth of, for example, 1 inch.

The side rails of the present invention are assembled from selected side rail segments as follows. An assembly stud 27 is inserted into (threaded within) the threaded central bore 31 of a first side rail segment 45 to be joined to second rail segment 41. (See FIG. 7) In certain preferred embodiments of the present invention, as the assembly stud engages and is threaded into the threaded central bore within the hub of the first side rail segment, it will arrest further engagement at a point defined by a stop 35, described above. The stop may simply be formed by configuring (tapping) the central bore receiver to end at a desired point, or by simply closing off a medial end of the bore so that contact of a stud therewith stops further advancement. It is preferred that such stops, uniformly are located and positioned so as to allow ½ of the length of an assembly stud to enter and be retained within the threaded central bore. After the assembly stud has reached the stop, a free end of the stud 43, now extending centrally and coaxially from the side rail segment into which it has been affixed, is rotated into the threaded bore of a second side rail segment 41—by rotating either or both of the segments together—. By configuring the depth of each threaded bore (depth from the distal end of the bore proximate the end of the segment) to be approximately ½ the length of the assembly stud, introducing, rotating 66 the side rail segments and torquing down the exposed end of the assembly stud into the assembly bolt receiver will form a strong butt joint 47 between the two segments. Proper torque can be quickly applied to the assembly stud by simply rotating the first segment while retaining the second segment in a fixed position. The central location of the threaded central bore within the side rail segment minimizes transference of lateral biasing forces to the bolt—as compared to the coaxial and coupler designs of the prior art—and thus provides a stronger joint while the radial arms extending from the hub provide a strong anchor. The centralized bolt receiver and threaded bolt bore therewithin enables such a custom length side rails to demonstrate superior strength and resistance to mechanical stress.

The cargo carrier of the present invention further comprises a plurality of primary crossbars 22 that run between, are disposed perpendicular to and are affixed to the left and right side upper and lower, vertically aligned and coupled side bars (left 5'/6' and 5/6 respectively) by means of a side rail coupler/crossbar adapter 49. In certain preferred embodiments of the present invention, additional supplemental crossbars 40, may be utilized to strengthen the carrier and to provide further support for cargo placed thereupon. Such supplemental crossbars are affixed to the lower side bars only (of the two vertically disposed left and right side rails 6'/6) by means of a side rail crossbar adapter 51. It is preferred that at least three primary crossbars, affixed via side rail coupler/crossbar adapters 49, be utilized in assembling the carrier. In actuality, since the vertically aligned side rails are affixed (coupled) to one another by the side rail coupler/crossbar adapter 49, primary crossbars affixed to the side rails either through that adapter or through the side rail crossbar adapter 51 are affixed, directly, or indirectly, to both upper and lower side rails.

Figure 11:
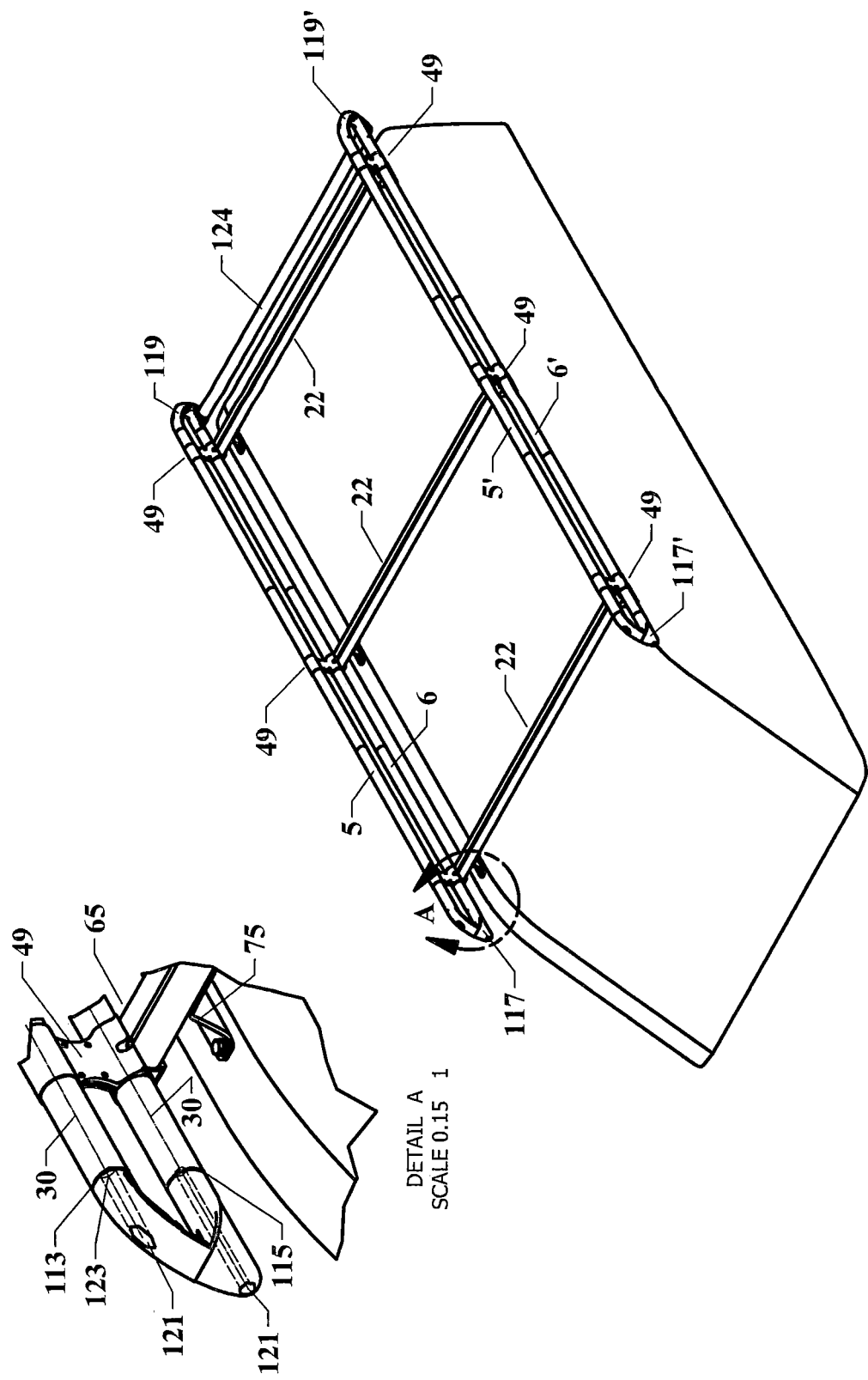
FIG. 11 is a top left isometric view of a cargo carrier in accordance with the present invention.

The supplemental crossbars function to provide additional support to cargo beyond the support provided by the primary support bars. Also, the supplemental crossbars can provide additional points of affixation of the carrier to vehicular roof top attachment flanges 53 and/or grooves 55 by means of the mounting base 75. Each crossbar is advantageously formed, for example, as an elongated rectangular bar having a top surface 57, a bottom surface 59, a front surface, a rear surface, as well as a right 65 and left end 67. The bottom surface of the crossbar includes a central groove 69 running the entire length of the crossbar, from the right to left terminus thereof. The top surface may also, optionally, include such a groove. The central groove 69 within the lower surface of the crossbar is especially shaped and configured to retain the head portion 82 of a plurality of assembly bolts 73 which are introduced into the central groove via bolt keyways 71 and 62 located proximal to the right and left ends of the crossbars and, optionally, on the lower inboard surface of the side rail coupler/crossbar adapter Such keyways enable placement of the assembly bolts 73 within the groove after the crossbar has been affixed to a crossbar to side rail adapter or to a crossbar adapter. In instances wherein a crossbar has already been affixed to a side rail or side rail segment, via a side rail coupler/crossbar adapter 49 the head portion of the assembly bolt is introduced within the keyway 71 located near the right and left ends of the central groove. The bolt is held within the confines of the groove which defines a width slightly greater than the diameter of the threaded portion of the bolt extending therefrom, but substantially less than the bolt head (which is thereby retained within the groove.) The assembly bolts 73, which easily slide along the central groove, are utilized, as described below, to affix the mounting base 75 of the present invention to the crossbar at a position along the length of the crossbar overlying, so as to properly engage a vehicle's roof top mounting feature such as a mounting flange 53 or groove 55. More specifically, the threaded portion of the assembly bolt 73, after the head of which is positioned within the central groove of the crossbar, is positioned and passed through mounting base assembly bores 42 and thereafter through washer 46 and nut 44. In the preferred embodiment illustrated in FIGS. 11a-11c, two such assembly bolts, bores, washers and nuts are thereafter tightened to firmly attach the crossbar to the crossbar mounting base cross bar engaging section 76 discussed below. At the same time, tightening of the assembly bolt, washer and nut also firmly locks the bolt head of the assembly bolt in a desired position along the central groove in the bottom surface of the crossbar. It is preferred that, prior to tightening the assembly bolt, the mounting base is positioned along the central groove 69 so that the mounting base overlies a roof top mounting groove, flange or other engagement feature and that the crossbar is positioned so that an equal amount of cross bar extends to the right and to the left of the longitudinal centerline of the vehicle's roof upon which it is mounted.

The right 65 and left end 67 of the crossbars are especially shaped and configured to mate with a portion of the inboard surface 77 of the lower portion of the side rail coupler/crossbar adapter, discussed below. The right and left termini of the crossbar also include screw receiver channels 79 therewithin which are so positioned and aligned so that, upon placement of the left or right end of a crossbar against the inboard surface of the lower portion of the side rail coupler/crossbar adapter, the screw access channel 81 as well as the screw bores 83 of the adapter lie in longitudinal alignment with the screw receiver channels 79 located at the ends of the crossbar, all discussed, in more detail, below.

The side rail coupler/crossbar adapter of the present invention includes an upper portion, which includes the upper hollow tubular portion 93 a lower portion which includes the lower hollow tubular portion 95 and a central tightening plate 89 therebetween. The adapter can also be described as including an inboard side 77 (as oriented when the carrier is mounted upon a vehicle roof.) The crossbar coupler/side rail adaptor also includes outboard side 91 (oriented outward and away from the vehicles roof and opposite rail) when the carrier is mounted upon a vehicle. The side rail coupler/crossbar adapter's upper 93 and lower 95 hollow tubular sections include central bores shaped and configured to enable passage therethrough of portions of the upper and lower side rails. The lower hollow tubular portion of the adapter 95, on the outboard surface, includes two screw access channels 81. Two additional screw bores 83, positioned in longitudinal alignment with the screw access channels, formed within the inboard surface, allow the passage of a portion of a side bar coupler/crossbar adapter to crossbar assembly screw 96 through the lower portion of the adapter in an inboard direction. The assembly screw is therefore able to pass through the screw access bore formed within the outboard surface of the lower portion of the adapter, and thereafter pass through the lower hollow tubular bore until the head portion of an assembly screw reaches the screw bore formed proximal to the inboard surface of the adapter. At that point, the relatively smaller diameter of the screw bore acts as a stop preventing passage therethrough of the screw. (The access channels allow a screw to be placed through the lower tubular bore on the outboard side so it can reach the screw bore on the inboard side for attachment of the crossbar before the side rails are run through the hollow tubes) A portion of the inboard surface 77 of the lower portion of the side rail coupler/crossbar adapter is especially shaped and configured to closely mate with the right or left terminus of the crossbar. When positioned so that the inboard portion of the lower section of the adapter is placed in mating contact with a right or left terminus of a crossbar, assembly screws 96, introduced through the access bores 81 may be advanced through the screw bores 83 of the adapter, engage and upon rotation mate with the screw receiver channels 79 of the crossbar so as to join the adapter to the crossbar.

Figure 12A:
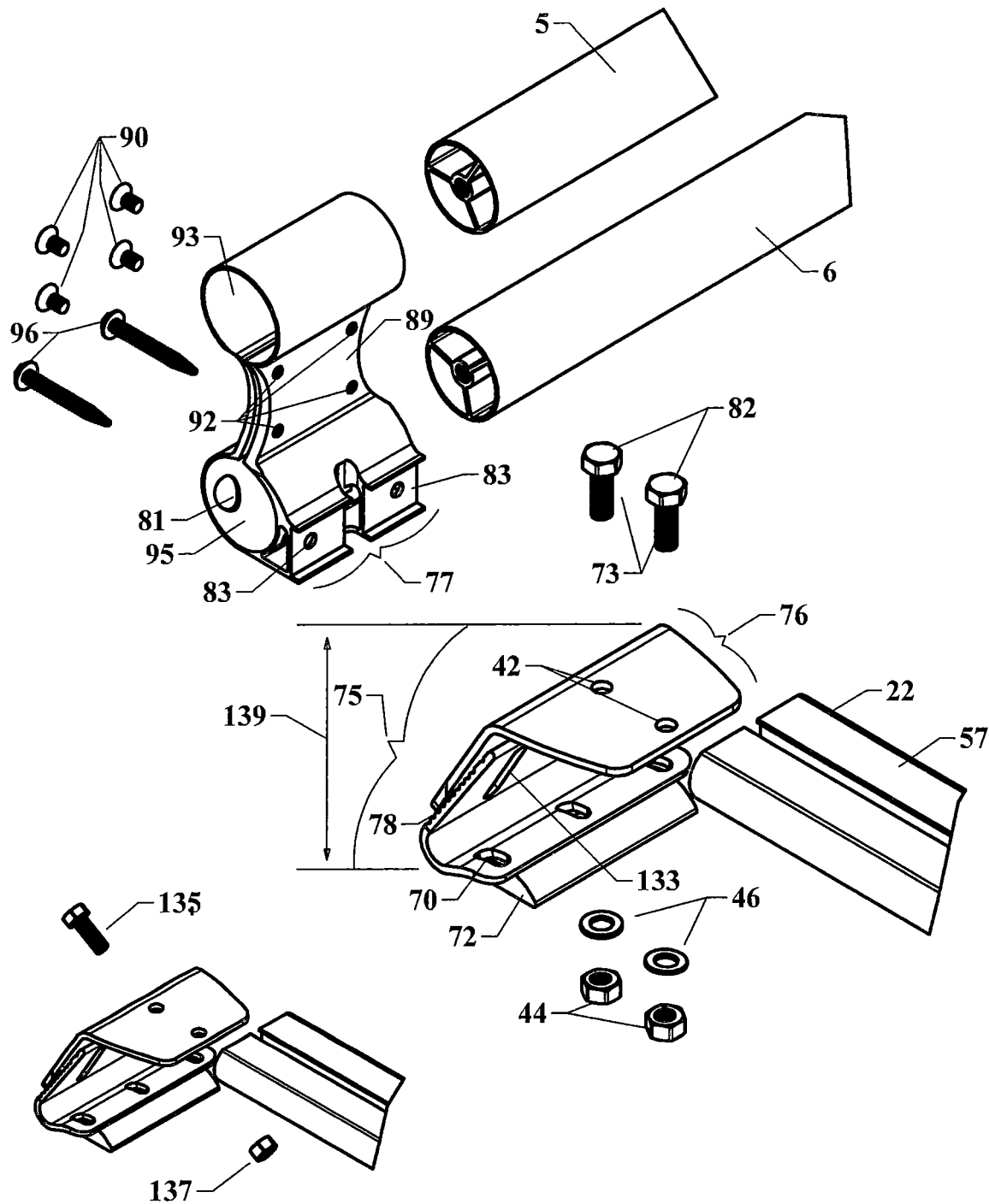
FIG. 12a is an exploded top right isometric view of a side rail coupler/crossbar adapter, mounting base, side rails and crossbar in accordance with the present invention.
Figure 12B:
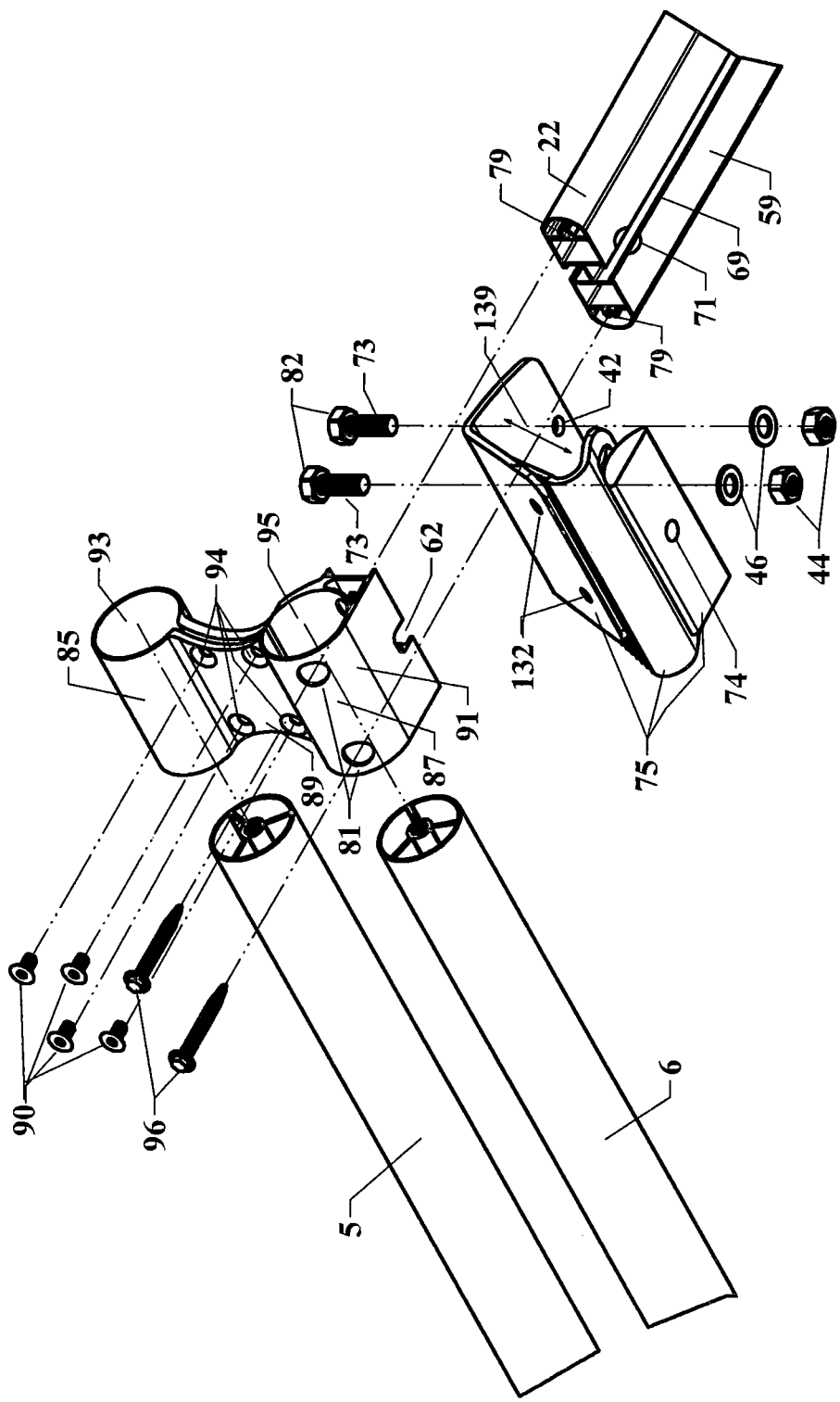
FIG. 12b is a bottom right exploded isometric view of a side rail coupler/crossbar adapter, mounting base, side rails and crossbar in accordance with the present invention.
Figure 12C:
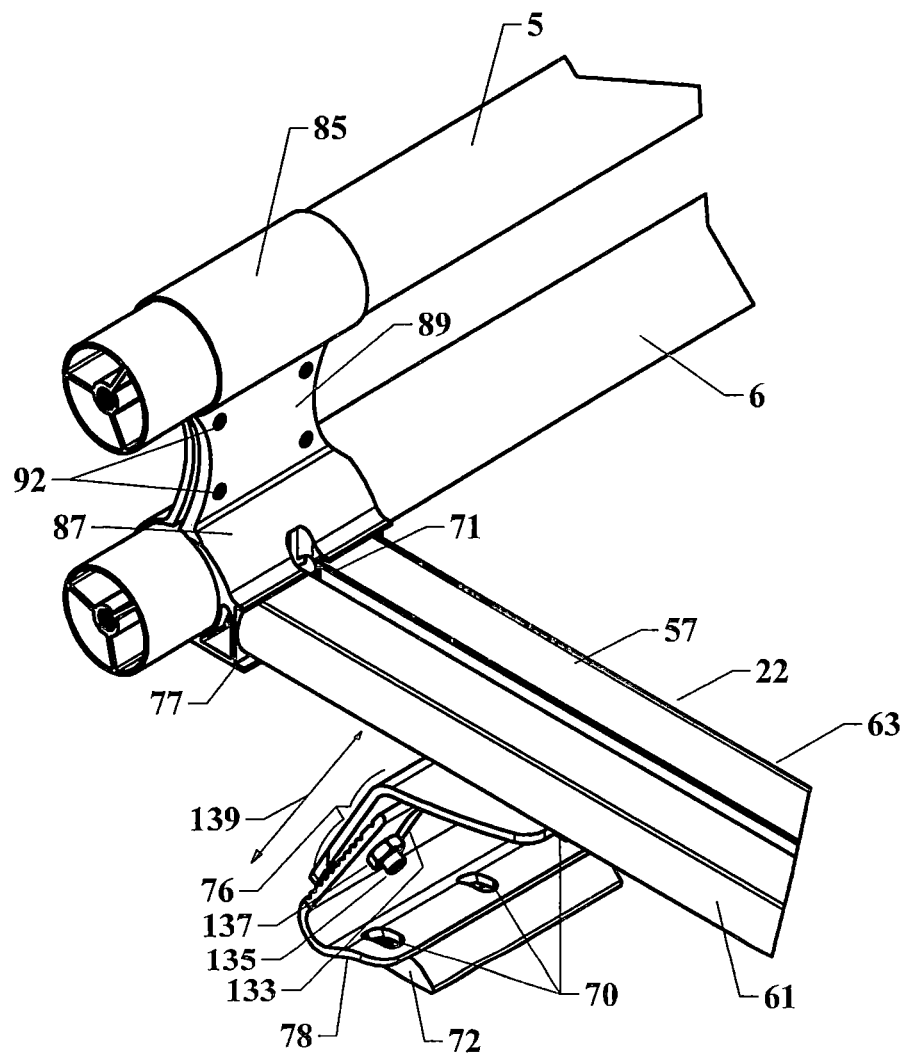

In assembling the modular roof top cargo carrier of the present invention, it is preferred and highly efficient to initially affix the side rail coupler/crossbar adaptor is to both the right and left terminus of each primary crossbar 22 to be incorporated within the carrier as discussed above. As shown in FIG. 12A-12C machine screws pass through access channels 81 located at the outboard portion of the bottom portion of each side rail coupler/crossbar adapter, and continue inward through the adapter screw bore 83 formed within the inboard portion 77 of the lower portion of the adapter. Thereafter the screw is introduced into the crossbar screw receiving channel 79 formed proximal to the right or left termini of the crossbars which are especially configured and adapted to allow passage and close adaptation of a pair of machine screws therewithin. Therefore, upon complete insertion through the receiving bores and rotational tightening of the screws into the receiving channels, the crossbar to rail adaptor becomes securely affixed to both the right and left termini of the crossbars.

In order to attach the cargo carrier of the present invention to a vehicle roof, a mounting base 75 is affixed to each of the primary crossbars, preferably after they have been affixed to the side rail coupler/crossbar adapter on either end of each crossbar. The assembly bolts 73, utilized to affix the crossbar 22 to the mounting base 75, may advantageously include a washer 46 positioned upon the bolt on one or both sides of the central groove running along the bottom portion of the crossbar, discussed above. Washers may be utilized to provide such retention, or in the alternative, the head of the assembly bolt may have a diameter great enough to allow it to be retained withing the central groove 69 formed through the lower surface 59 of the crossbar while a single washer may be sufficient to keep the bolt in place when positioned upon the bolt on that portion that extends outside of the slot. In any event, the bolt or bolt/washer combination must demonstrate a diameter small enough to enable passage thereof through the crossbar central groove keyway 71 formed adjacent the right and left terminus of the crossbar lower surface 59 and optionally, the corresponding side rail coupler/cross bar adapter keyway 62 located while large enough to prevent the bolt from dropping through the remaining portion of the central groove. At least one crossbar assembly bolt 73, and, more advantageously, a pair of such bolts are positioned within the central groove 69 formed within the lower surface of the crossbar adjacent to both the right and left termini of each crossbar with the threaded portion of the bolt extending out from the bottom surface of the crossbar while the head of the bolt remains captured within the slot. An assembly nut 44, as described below, is utilized to affix the bolt, captured within the central groove of a crossbar after the threaded portion of the bolt has passed through the mounting plate engagement bores 42 which enables, upon tightening, the crossbar to be firmly affixed to the upper portion of the mounting plate.

It is preferred that the lower portion of the mounting base 75 be especially shaped and configured to enable secure attachment to a vehicle roof mounting feature such as, for example, a flange or, in other configurations, a groove. The mounting base 75 includes a crossbar engagement section 76 and a roof engagement section 78 which can be configured to engage a vehicular roof groove, flange or other attachment feature. As shown in the figures, in the embodiment illustrated within FIGS. 12a through 12c, the roof groove engagement section is designed, shaped and configured to affix the carrier to a vehicle roof featuring a groove mounting feature. Therefore, the mounting base includes a groove insert 72 which is designed to fit within, align and engage a vehicle roof groove. Adjustment slots 70 formed within the roof engagement portion 78 of the mounting base are utilized to affix and adjust the position of the groove insert 72 so that, when tighten in place by means of a set screw or bolt, the insert is locked into position within the groove so as to affix the mounting base to the vehicle. As is well understood and known to the art, the roof flange and roof groove engagement sections of the mounting base can be easily configured to enable secure attachment of the mounting base to vehicle roof flanges, attachment grooves and other roof engagement features as provided by various vehicle manufacturers.

In mounting the vehicular roof top cargo carrier of the present invention to a vehicle, it is preferred that the crossbars are initially loosely affixed to the mounting bases via the crossbar assembly bolts, washers and nuts discussed above. This allows the crossbars to be positioned so that the right and left ends thereof are in a desired relation with the vehicle roof. For example, it is ordinarily preferred that the position of the crossbars and loosely attached side rail coupler/crossbar adapters are positioned and aligned so that the crossbar is centered along the midline (fore aft centerline 52) of the vehicle roof (providing an equal length of crossbar extends outboard from the mounting bases adjacent to the right and to the left end of each crossbar). After the crossbars are so adjusted, the assembly nuts 44 may then be utilized to tighten the cross bar assembly bolts so as to lock the crossbar in proper position. Thereafter, the roof engaging sections of the mounting bases may be tightened so as to firmly affix the carrier in place in the usual manner.

In certain alternate preferred embodiments of the present invention, the mounting base is configured as a height adjustable base which provides a height adjustment so that the height of the carrier above a vehicle's roof can be adjusted. The adjustable mounting base utilizes the two sections, discussed above—the crossbar engagement section 76 as well as a roof engagement section (such as a roof flange engagement section 78) These sections are affixed to one another via height adjustment bores 132 which is formed within the roof engagement section of the mounting base and adjustment grooves 133 which are formed in the crossbar engagement section of the mounting base. Height adjustment bolt 135 passes through the height adjustment bore and thereafter through the height adjustment groove and is loosely held in place by height adjustment nut 137. Thereafter, the two sections of the mounting base can be adjusted in regard to height as shown by arrow 139 so as to enable the height of the crossbar, and the carrier to which it is affixed, to be adjusted to conform to a particular roof contour as desired. As illustrated in this figure, the two sections are slideably affixed to one another so as enable adjustment of the height of the mount.

In addition to the side rail coupler/crossbar adapters, supplemental crossbars may be affixed to the side rails—usually the lower side rail on each side of the carrier—. There is no structural difference between a primary or supplemental crossbar. The difference lies on the manner in which the crossbar is affixed to side rails. Primary crossbars are attached to an upper and lower side rail by means of the side rail coupler/crossbar adapter discussed above. Supplemental crossbars are attached to the side rails between the afore-mentioned side rail coupler/crossbar adapters 49, by means of a side rail crossbar adapter 51. Such adapters are illustrated, in detail, in FIGS. 13*a* through 14*b*.

Figure 10:
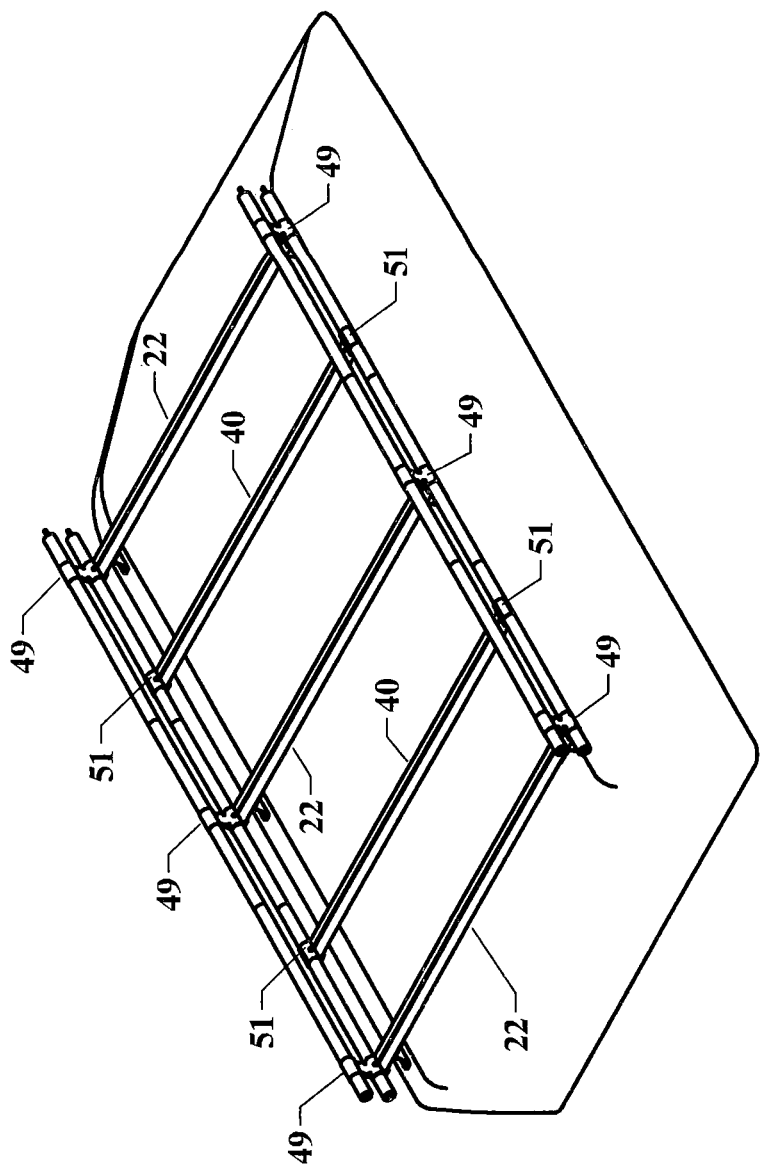
FIG. 10 is a top right view of a cargo carrier in accordance with the present invention.

As illustrated in FIGS. 13*a* through 14*b*, the side rail crossbar adapter is configured and shaped to include an upper curved portion 99 that includes a radius enabling the adapter to overly and closely conform to a portion of the upper surface of a lower left and right side rail. An inboard portion 101 of the crossbar adapter is especially shaped and configured to mate with either the right 65 or left end 67 of a crossbar. Screw assembly bores 103 which are formed within and through the inboard portion of the side rail crossbar adapter are especially located so that, when the inboard portion of the crossbar adapter is aligned and placed in mating contact with the right or left terminus of a crossbar, the threaded assembly bores 79 located at the right and left termini of the crossbars align with the screw assembly bores 103 formed within and through the inboard portion of the side rail crossbar adapter. Screw access bores 108 formed within the inner portion of the inboard portion of the adapter enable access to the screw assembly bore 103. Therefore, an assembly screw 104 which passes through the access bores inserted through the crossbar assembly bore in an inboard direction, will mate with an affix the adapter to the right or left end of a crossbar upon tightening of the assembly screw. Thereafter, the upper curved upper portion 99 of the crossbar adapter may be placed so as to overly an upper portion of the left and right lower side rail. Assembly screw receiving bores 107 formed through the retention plate 97 align with threaded assembly screw receiving bores 110 formed in the bottom surface 105 of the inboard 101 portion of the side rail crossbar adapter when the retention plate is positioned against the bottom surface of the adapter (so as to capture a lower side rail). These bores allow passage of mounting plate assembly screws 109 through the receiving bores 107 of the plate and thereafter into the bottom surface of the inboard portion of the adapter so as to firmly affix the crossbar adapter plate to the crossbar adapter so as to secure the adapter and crossbar to which it is affixed to the side rail. Use of additional supplemental crossbars may be elected in order to better distribute the weight bearing capacity of the roof top carrier. As shown in a preferred embodiment of the present invention illustrated in FIG. 10, the assembled side rails, consisting of a left and right pair of vertically aligned side rails, are joined, not only by primary crossbars 22 retained by side rail coupler/crossbar adapters 49 discussed above, and, in certain embodiments, by supplemental crossbars 40 which are attached to the right and left lower side rails 6/6' by means of side rail crossbar adapters 51.

As illustrated in FIG. 1, in preferred embodiments of the present invention, the fore 15 and aft 17 ends of each side rail are affixed to each other by rail ends 117/119. For this purpose, the rail end is especially configured roughly in a "U" shape having a superior 113 and an inferior 115 end (which may also be referred to, with equal meaning, as a superior and inferior terminus) when mounted upon a pair of vertically aligned side rails which, in turn, are mounted upon a vehicle roof. The rail end is especially shaped and configured so as to allow the superior terminus to align and mate with the end of an upper side rail 5/5' while the inferior terminus of the rail end simultaneously aligns with the end of a lower side rail 6/6'.

As show in sectional FIGS. 15*a* and 15*b*, certain preferred embodiments of the vehicular roof top cargo carrier of the present invention utilizes two types of rail end to affix the fore and aft ends of the upper and lower, vertically aligned side rails on both the right and left sides of the carrier. The first type of rail end, the fore rail end 117 which is illustrated in FIG. 15*a*, is configured for use in joining the terminal ends of an assembled side rail at the fore end of the carrier. For this purpose, the fore rail end includes an assembly bore 121 located therewithin with openings to said bores proximate to the inferior 115 and superior 113 ends of the rail end at both ends of the bore. The proximal opening to the bore is located at the forward portion of the rail end and the distal opening is located at the superior and inferior terminus thereof. The bores run completely through the rail ends having openings at the proximal and distal ends of each such assembly bore. Furthermore, the assembly bores within the superior and inferior ends of the fore rail end assembly bore are located and configured so as to be positioned in longitudinal alignment with the longitudinal axis 30 of the upper and lower side rails, respectively when the fore rail end is properly aligned and placed in position against the fore termini of the upper and lower side rails. An assembly nut 123 is firmly affixed within each of said assembly bores with the longitudinal bore of the threaded bore thereof 116 in longitudinal alignment with the longitudinal axis of the fore rail end assembly bores. Therefore, upon positioning the fore rail end upon the fore ends of the upper and lower side rails, the threaded central bore of the said side rails, as well as an assembly stud affixed and extending therefrom 43, will lie in longitudinal alignment with the rail end assembly bore 121 as well as the threaded bore 116 of the assembly nut held therewithin. The threaded bore of the assembly nuts 123 is especially configured and sized so as to allow it to matingly capture and securely anchor an assembly stud extending from the fore end of the upper and lower side rails. The assembly stud is securely held within the threaded central bore of the assembly stud receiver located at the fore terminus of a side rail. Thus, by simply rotating the upper and lower side rails, an assembly stud 43 located at and extending from each such side rail's fore end will engage the assembly nut 123 within the fore rail end assembly bore 121 and affix both the upper and lower side rails to the fore rail end in a strong butt joint. This same process is utilized to join the upper and the lower side rails on both the right and left side of the carrier to a rail end.

In a preferred method of assembly the custom roof top cargo carrier and carrier kit of the present invention, the fore rail ends are affixed to the side rails prior to affixing the aft rail ends so as to facilitate more efficient assembly. More specifically, during assembly and mounting of a carrier to a vehicle roof top, the side rails and side rail segments of which they are assembled initially are not tightly engaged by the side rail coupler/crossbar or side rail crossbar adapters. Leaving such adapters in loose contact with the side rails allows free rotation of the side rail segments therewithin forming the side rails during rail assembly. Further, after each side rail is fully assembled from the segments of which they are comprised, such loose contact with the adapters enables each of the side rails to be rotated, as a unit, in order to quickly affix the individual side rail segments tightly to each others as well as to affix the complete side rail to the fore rail ends as described above.

In certain preferred embodiments of the present invention, an aft rail end 119 illustrated in FIG. 15b is utilized to join the right and left vertically aligned pair of side rails at the aft end 17 of these side rails (which are oriented towards the rear of the vehicle roof during and after assembling and mounting the carrier upon a vehicle). For this purpose, the superior 125 and inferior 127 ends of the rear rail ends include an assembly bolt channel 129 especially shaped and configured for the passage into, and retention thereby of a rail end assembly bolt 131. The assembly bore channel is formed so that when the superior and inferior termini of the aft rail end is positioned in alignment with the aft ends of the upper and lower assembled side rails. The longitudinal axis of the rail end assembly bore channel lies in longitudinal alignment with the threaded central bore 33 of the assembly stud receiver hub located at the aft terminus of each upper and lower side rail. The assembly bolt channel of the aft rail end is also formed with a constricted bore 134 just adjacent to both the superior and inferior rail end termini, just prior to the proximal end thereof, so as to act as a stop to prevent complete passage of the head of the assembly bolts 131 through the assembly bolt channel. Thus, by inserting a rail end assembly bolt into the rail end bore channel—after the inferior end and superior end of the aft rail end is aligned with the aft ends of a lower and upper side rails respectively, the assembly bolts are likewise aligned with and can be threaded into the assembly bolt receiving channel 155 of said side rails so as to firmly affix the superior and inferior side rails to one another to form a strong, tight butt joint. The assembly bolt is configured and designed to demonstrate a length that enables, upon full engagement of the threaded central bore of the assembly stud receiver of the aft end of the side rails, a firm and stable butt joint between the rear rail end and the superior and inferior side rails. In some alternate preferred embodiments, a aft rail end load assist bar 141 is disposed between the right and left aft rail ends as shown in the figures. The aft rail assist bar assists the loading of cargo from the aft end of the carrier by allowing such cargo to be slid or rolled over the assist bar.

Referring to FIGS. 12a through 12c, it is preferred that, only after the four aft rail ends have been affixed to the upper and lower right and left side rails, that the side rails are tightened into place within the side rail coupler/crossbar adapter by tightening the side rail coupler/crossbar adapter tightening plate screws 89 which are sized and configured to pass through tightening plate screw access bores 94 located on the outboard portion of the tightening plate to reach and engage tightening plate screw bores 92 located on an inboard portion of the tightening plate. In addition, if supplemental crossbars have already been placed upon the lower left and right side rails, at this point of assembly, the side rail crossbar adapters (in embodiments utilizing supplemental crossbars) may also be tightened. Tightening these adapters prior to affixing fore rail ends would prevent rotation of the side rails and thus interfere with such affixation. However, it is preferred that such supplemental crossbars be added after all rail ends have been affixed to the side rails. In this manner, affixing the aft rail ends to the now stabilized side rails is facilitated as such side rails will not rotate. As mentioned above, such tightening is not accomplished prior to complete assembly of the side rail segments as well as the side rail ends so that rotation of the segments can be easily utilized to assemble the unit while the segments can freely rotate within the side rail to crossbar adaptors.

In alternate preferred embodiments of the present invention illustrated in FIGS. 16a and 16b, the fore rail ends 117/117', the aft rail ends 119/119', or both fore and aft rail ends may be replaced, or substituted for by accessory mount bars. As shown in FIGS. 10a and 10b, such accessory mount bars include, but are not limited to, an aft accessory cargo assist bar 141, an aft accessory cargo assist double bar 143. Also, such accessory cargo devices include a fore double mount bar 145, an extended fore single accessory mount bar 147, an extended fore double accessory mount bar 149 as well as a fore spoiler accessory mount bar 151. Each of the accessory mount bars is affixed to the upper and lower left and right side rails, at the fore and aft end thereof, by means of proximal ends thereof which are shaped and configured in a U form having a superior and inferior portion. Each of said accessory mount bars attach to the fore or aft end of the side rails in the same shape, manner and configuration as the fore and aft rail ends discussed above. For example, the right proximal end 142 of aft cargo assist bar 141 is shaped and configured in the same form and manner as the right aft rail end discussed above. However, in regard to the aft accessory cargo double bar 143, said accessory is affixed to the aft end of the right and left upper and lower side rails 17/17' utilizing an aft double bar adapter 161 which is especially adapted to affix the aft cargo bar to the right 163 and left 163' ends of the aft double bar to the right and left aft ends of the side rails 17/17'. More specifically, the aft double bar adapter utilizes two adapter screws 164 to affix the adapter to assembly stud receivers 19 located at the aft ends of the right an left upper and lower side rails. Thereafter, aft double bar adapter studs 165 are utilized to affix the double bar to the adapter—already secured to the aft side rail ends, by passing said studs through bores adapter bores 167 and thereafter securing the adapter (now affixed to the aft side rail ends) by means, for example, of washers 168, split washers 169 and nuts 170. The remainder of the accessories bars, as shown in FIGS. 16*a* and 16*b*, are affixed to the aft ends of the right and left upper and lower side rails 17/17' and the fore ends thereof 15/15' by means of forming, shaping and configuring the right and left ends of each such accessory to mimic the shape and function a fore rail end 117 or an aft rail end 119 respectively.

For example, the right proximal end 142 of aft accessory cargo assist bar 141 is joined to the vertically aligned pair of side rails at the aft end 17 of the side rails which is oriented towards the rear of the vehicle roof during mounting of the carrier. For this purpose, the superior 152 and inferior 153 terminus of the proximal end of the assist bar include an assembly bolt channel 155 especially shaped and configured for the passage into, and retention thereby of an accessory rail end assembly bolt 157. The assembly bore channel is formed so that when the superior and inferior termini of the right proximal end of the cargo assist bar is positioned in alignment with the aft end of the right superior and inferior assembled side rails, the longitudinal axis of the proximal end assembly bore channel lies in longitudinal alignment with the threaded central bore 33 of the assembly stud receiver hub. The assembly bolt channel of the right proximal end of the cargo assist bar is also formed with a constricted bore 158 just adjacent to both the right superior and inferior terminus so as to act as a stop to prevent complete passage of the head of an assembly bolt 157 through the assembly bolt channel. Thus, by inserting an accessory rail end assembly bolt into assembly bolt channel—after the right inferior end and superior proximal end of the aft accessory cargo assist bar is aligned with the aft ends of a lower and upper side rails, the assembly bolts are likewise aligned with and can be threaded into the segment assembly bolt receiving channel at the end of the of said side rails so as to firmly affix the superior and inferior side terminus of the accessory to the right side rails to form a strong butt joint. The left proximal terminus of the accessory cargo assist bar has a like configuration and is affixed to the aft ends of the left upper and lower side rails in the exact same manner. In fact, all of the aforementioned aft accessories include proximal ends configured in the same manner and shape as the aft rail ends described above, in detail, and thus are affixed to the aft end of the right and left vertically aligned side rails in the same manner. In a similar manner, the fore accessory mount bars described above include, at their proximal ends a superior and inferior terminus especially shaped and configured in the same manner as the fore rail ends 117 described above, and are affixed to the right and left fore rail ends in the exact same manner as the fore rail ends.

In order to configure the vehicular roof top carrier kit of the present invention for a particular vehicle having a fore/aft length 50, a determination is initially made of the desired total fore/aft length 2 of the carrier—as defined by the length of the right and left side rails plus the length of a front and rear end rail, or accessory mount bar, discussed above and below. The overall width of the carrier 4 is largely determined by the length of the crossbars 22 selected in a kit. It is preferred that the vehicular roof top carrier of the present invention be assembled in a particular order so as to facilitate the ease of such assembly. As mentioned above, a determination is made as to the desired fore/aft length 26 of the assembled side rails desired for a particular vehicular roof. After determining the desired length (fore/aft dimension) of the side rails, a plurality of side rail segments are selected for assembly into two right (6/6') and two left (5/5') side rails. In order to calculate the number and lengths of the side rail segments required to assemble side rails of a determined length, a side rail calculation table, such as Table 1, shown above, may be utilized. Utilizing such a table, it is simple to calculate the number of each size rail segments that will need to be included within the kit in order to fabricate four side rails of the desired overall length. The selection of the side rails necessary to provide a cargo carrier of a desired overall fore/aft length can be made by an end user or, in the alternative, utilizing such selected side rail segments, a manufacture can offer kits with an assortment of pre-selected side rail segments that will yield a carrier of a pre-determined overall length.

In order to ease assembly, it is preferred that the initial assembly step is to affix a side rail coupler/crossbar adapter 49 to the right 65 and left 67 end of each of at least three primary crossbars 22 in the manner described, in detail, above. It is preferred that a minimum of three primary crossbars be affixed to six side rail coupler/crossbar adapters. Thereafter, a mounting base 73 is affixed to the crossbar proximate to the right and left ends of each such crossbar utilizing the central groove 69, washer, nut and assembly bolt 73 as discussed above. However, the mounting base, at this point, is only loosely connected to the crossbar so as to enable the mounting bases to be moved laterally along the bar. After the crossbars have been securely affixed to the side rail coupler/crossbar adapter and loosely affixed to the mounting bases, the bars are placed in position on a vehicle roof perpendicular to the fore/aft centerline 52 of the roof in such a manner as to be equally distributed along the length of the side rails and spanning the width 54 of the roof. Thereafter, the mounting bases are slid along the central groove of the crossbar until they are positioned so as to overlie and therefore enable engagement of a vehicle roof top attachment flange 53 or groove 55. Optimal positioning of the mounting bases places the crossbars in a manner wherein the center point of the length of such bars is in alignment with the fore/aft centerline of the vehicle roof 52 which bifurcates the roof, as a reference line into a right and left sides of equal width. Once so properly positioned, the assembly bolt, washer and nut utilized to affix the mounting bases to the crossbars are tightened for secure attachment and the base is likewise tightened to the roof flange or groove as discussed, in detail, above. The mounting base of the present invention is configured in multiple forms, as described above, so as to enable affixation to various such flanges and grooves in the usual manner.

Thereafter, the side rail segments are assembled to one another, in the manner described above and urged through the upper and lower hollow tubular bores of the side rail coupler/crossbar adapter until all four side rails are fully assembled and loosely contained within the upper and lower tubular bores of the side rail coupler/crossbar adapters. More specifically, the side rails, at this point, are held loosely within the hollow tubular upper 93 and lower 95 bores of the adapter.

With the side rails securely assembled and loosely affixed within the hollow tubular bores of the side rail coupler/crossbar adapter, the fore end of the assembled side rails are affixed to the fore rail ends by rotation of the side rails so as that the assembly stud 43 extending from the fore end of each side rail engages the rail end assembly nut 123 so as to affix all four side rails, at their fore end, with the fore rail ends. Such rotation also assures that the segments are tightly affixed to one another. Thereafter, the tightening plates 89 are tightened with the aforementioned screws 90 so as to securely affix the side rails within the upper and lower hollow tubular bores of the adapter. The aft rail ends 119 is now affixed to the aft end of the side rails as described above. Thereafter, optionally, additional supplemental crossbars 22 may be affixed to the side bars so as to traverse the width of the roof utilizing the side rail crossbar adapter 51 discussed above.

The components of the cargo carrier, including the side rail segments, crossbars, side rail coupler/crossbar adapters, side rail crossbar adapters, mounting bases, rail ends and accessory mount bars of the present invention may be formed from various materials. For example, such components may be formed from a metal such aluminum, an aluminum alloy, steel and steel alloy. Alternatively such components may be formed of a plastic material such as polycarbonate, polyvinyl chloride, polypropylene, or composite plastic. A reinforced carbon fiber material may also be utilized for such components.

As stated above, in an alternate preferred embodiment of the present invention, the side rail segments of the present invention, and the side rails assembled therefrom, are disclosed as independent, as improved side rail components, that can be advantageously integrated and utilized within virtually any vehicular roof top carrier utilizing side rails. As illustrated in FIG. 1, right and left, side rail 5/6 and 5'/6' upper and lower side rails as well as the side rail segments which are assembled to form such rails, are integral components incorporated within the preferred embodiment of the present invention: a custom vehicular roof top cargo carrier kit. In regard to the first alternate embodiment of the present invention, illustrated in FIGS. 22-25, these same side rail segments, formed as round tubes, produced in assorted lengths and having two hubs 185 including centrally located assembly stud receivers 182 located therewithin positioned proximal to the fore and aft termini utilized to form powerful joints between such segments—as described more fully, and in great detail above in regard to the preferred embodiment, provide an advantageous improvement when integrated within any vehicular roof top carrier utilizing side rails such as those found in the prior art. Integration of the side rails disclosed herein within such carriers affords such devices with the increased strength and rigidity. In addition the location of the threaded central bore 184 and assembly stud utilized to affix one side rail segment to an adjacent segment, provides an affixation method wherein the segments themselves can by simple rotation of the segments 186 be assembled into complete side rails (see FIGS. 22, 24 and FIG. 9 ((in relation to the preferred embodiment)). This method enhances the speed of assembly of such side rails while enabling the carrier utilizing the side rail segments and the assembled side rails of the present invention to produce a carrier of virtually any desired fore/aft length. As illustrated in FIGS. 3 and 4, discussed in much detail above, the side rail segments of the preferred as well as the alternate preferred embodiment of the present invention are provided in a substantial range of lengths. Therefore, integrating such side rails into other vehicular roof top cargo carriers and roof top platforms enables such carrier and platforms to be customized into a fore/aft length appropriate for a particular vehicle's roof or application of use.

The preferred embodiment of the present invention discloses a custom vehicular roof top cargo carrier incorporating two vertically aligned left 5/6 and two vertically aligned right 5'/6' side rails. For this purpose, in the preferred embodiment of the present invention, the aforementioned side rail coupler/crossbar adapter 49 is utilized to couple the upper and lower left and right side rails as well as provide a means of fixation 77, 83 for cross bars 22. The side rails of the preferred embodiment are affixed to a vehicle roof by means of their affixation to primary crossbars 22 which, in turn, are attached to vehicle roofs by means of a mounting base 75.

The assembled side rails of the alternate embodiment can be utilized in applications wherein, for example: only a single left and single right side rail (see FIGS. 24 and 25) are incorporated into a carrier; two or more vertically aligned side bars are incorporated into a carrier (see FIGS. 22 and 23); crossbars are and are not incorporated into a carrier; and in configurations wherein a platform is incorporated into the carrier.

As illustrated in FIGS. 24 and 25, utilizing a single left and right side rail 188/188' in accordance with the alternate preferred embodiment of the present invention may by highly advantageous in providing a carrier with a lower profile—a reduced height above the vehicular roof to which the side rails are affixed—. When greater height above a vehicle roof 191 is an advantageous feature of a vehicular roof top carrier—providing greater contained carrier volume and increased cargo retention, two or more vertically aligned side rails 190/192 can provide such utility. (See FIGS. 22 and 23) Vehicular roof top platforms may also incorporate the side rails of the alternate embodiment of the present invention. Each of the aforementioned roof top carrier and platforms gains the improved strength, ease and increased speed of assembly and custom fore/aft length afforded by incorporation of side rail segment and side rails assembled thereby disclosed herein.

In incorporating the side rail segments and side rails of the alternate embodiment into roof top carriers—other than the preferred carrier disclosed herein—a means of securing such side rails to a vehicle roof is required. If such side rails are utilized to support, for example, crossbars or platforms, a means of doing such may also be provided. In regard to securing the side rails of the alternate embodiment to a prior art carrier or platform, it is highly preferred, but not required, that the adapter or bracket utilized to do so enables the side rail segments and side rails assembled therefrom to freely rotate 194 therewithin—as described herein in regard to the custom vehicular roof top cargo carrier kit—. More specifically, it is especially preferred that such an adapter advantageously secures the disclosed side rails to a side rail adapter in such a manner as to enable the side bars to freely rotate about their longitudinal axis within such adapters which may also be referred to herein, with equal meaning, as side rail brackets. Such free rotation enables, as discussed below, quick and easy assembly of side rail segments via rotation within such brackets. After such assembly is complete, such brackets may be tightened to firmly secure the side rails into position. In regard to carriers that incorporate a single right and single left side rail, it is highly advantageous that the adapter/bracket utilized 196 as illustrated in FIGS. 24 and 25, rotatably 194 affixes each side rail to thereto. This same bracket may include, as illustrated in FIGS. 24 and 25, a means of affixing the bracket to a vehicle roof such as the flange base 198, utilizing machine screws 200 to affix the flange base to a vehicle roof 191 by engaging, for example, bores 203 formed through the flange base and threaded bores 204 prepared as mounting features within the vehicle roof. In addition, such brackets, as the bracket 196 illustrated in FIGS. 24 and 25, may also provide a mounting point for a crossbar 206. By, for example, utilizing a crossbar insert 208 which is affixed to each end of a cross bar via corresponding bores 210 and 212 formed through the upper surface of each crossbar adjacent the terminus thereof and through the top surface of the insert 208 in such a manner that, upon insertion of the insert within the hollow end of the crossbar, said bores align, an assembly screw 214 may be utilized to affix the insert to the crossbar. Thereafter, two bores formed within the outboard surface of the insert are configured and positioned so as to align and correspond with bores 216 formed within a crossbar receiving flange 218 of the bracket 196 so as to enable assembly screws 220 to firmly affix the crossbar to the bracket. The type of bracket illustrated in FIGS. 24 and 25 enables the side rail and side rail segments it engages 188 to freely rotate within the side rail receiving section 222 of the bracket so that the side rail segments can be rotated therein for ease of assembly of a complete side rail. Thereafter, for example, assembly screws, washers and nuts (224, 226 and 227) can be utilized to firmly lock the side rail into place within the mount. Although it is preferred that the side rail of the present invention be affixed to a vehicle utilizing a mount, such as the one illustrated in FIGS. 24 and 25 that allows such rotation, it is also contemplated that full assembly of the side rails of the alternate embodiment may be assembled prior to mounting upon a vehicle. In such instances, a mount may be utilized that does not enable rotation therewithin.

In regard to applications where multiple vertically aligned side rails are utilized (such as illustrated in FIGS. 22 and 23), it is preferred that such brackets enable the rotation of side rails therewithin as discussed above in regard to applications utilizing a single left and right side rail. FIGS. 22 and 23 illustrate an example of a side rail mount that provides a means of affixing cross bars to such brackets as well as providing an integrated roof mounting flange. However, the side rails of the alternate embodiment may be utilized with a mounting means that does not provide: affixation of crossbars, direct affixation of the mount to a vehicle roof, or enable rotation of the side rails of the present invention therewithin. However, it is highly advantageous that such mounts allow the side rails to freely rotate therewithin until after the side rail segments contained by such are fully assembled.

In regard to carriers that incorporate, for example, two right 190/192 and two left 190'/192' side rails, it is highly advantageous that the adapter/bracket utilized 230, as illustrated in FIGS. 22 and 23, rotatably 194 affixes each side rail to thereto via, for example, a side rail receiver 242. This same bracket may include, as illustrated in FIGS. 22 and 23, a means of affixing the side rail segment/side rail assembled therefrom to a vehicle roof such as the flange base 232, utilizing machine screws 234 to affix the flange base to a vehicle roof 191 by engaging threaded bores formed through the base 205 as well as bores 204 prepared as mounting features within the vehicle roof. In addition, such brackets, as the bracket 230 illustrated in FIGS. 22 and 23, may also provide a mounting point for a crossbar 206. For example, utilizing a crossbar insert 208 which is affixed to each end of a cross bar via corresponding bores 210 and 212 formed through the upper surface of each crossbar adjacent the terminus thereof and through the top surface of the insert 208 in such a manner that, upon insertion of the insert within the hollow end of the crossbar, said bores align, an assembly screw 214 may be utilized to affix the insert to the crossbar. Thereafter, bores formed within the outboard surface of the insert so as to align and correspond with bores 216 formed within a crossbar receiving flange 218 of the bracket 230 enable assembly screws 220 to firmly affix the crossbar to the bracket. The type of bracket illustrated in FIGS. 22 and 23 enables each of the two vertically aligned side rails and side rail segments it engages 190/192 to freely rotate within the side rail receiving sections 242 of the bracket so that the side rail segments can be rotated therein for ease of assembly of a complete side rail. Thereafter, assembly screws, washers and nuts (224, 226 and 227) are utilized to firmly lock the side rail into place within the mount. Brackets 196 and 230 are presented herein only as examples of brackets that may be utilized to incorporate the side rail segments and side rails assembled therefrom of the alternate preferred embodiment into virtually any vehicular roof top cargo carrier that utilizes side rails.

I claim:

1. A vehicular roof top cargo carrier side rail comprised of a plurality of side rail segments, a plurality of segment assembly studs and a plurality of brackets; wherein
   each of the plurality of side rail segments is shaped and formed as a round tube having a length, a diameter, a fore end, an aft end and a longitudinal axis running along a radial center thereof, the length of each side rail segment is equal to a distance between the fore and aft end thereof, the side rail segments demonstrates a plurality of lengths, each side rail segment includes two segment assembly stud receivers, one of the segment assembly stud receivers being located proximal to the fore end and one segment assembly stud receiver being located proximal to the aft end thereof; wherein
   each of the segment assembly stud receivers is configured to include a hub mounted therewithin, each hub has a threaded central bore longitudinally aligned with the longitudinal axis of each of the plurality of side rail segments, the threaded central bore demonstrates a depth and includes threads formed therein especially shaped, dimensioned and configured to mate with and securely retain each of the plurality of segment assembly studs and each threaded central bore includes a stop limiting the depth to which an assembly screw can be threaded therewithin;
   each of the plurality of segment assembly studs demonstrates a length and is formed and configured to include threads running the length thereof which correspond to and matingly engage the threaded central bore of adjacent side rail segments; and
   each of the plurality of brackets is configured and adapted to secure the side rail segments and side rails assembled therefrom to a vehicle roof; wherefore
   threading one end a segment assembly stud into the threaded central bore of the hub of a selected side rail segment having a selected length and, thereafter, threading an opposite end of the segment assembly stud extending laterally from the selected side rail segment directly into the threaded central bore of the hub of an adjacent side rail segment having a selected length forms a strong butt joint directly between the side rail segments and creates a side rail having a length equal to combined lengths of the selected adjacent side rail segments.

2. The vehicular roof top cargo carrier side rail of claim 1 wherein each of the plurality of brackets enables each of the plurality of side rail segments and side rails assembled therefrom to freely rotate therewithin.

3. The side rail segment of claim 1 wherein the depth of the threaded central bore is especially configured and selected to be equal to about one half the length of each of the plurality of segment assembly studs.

4. The side rail segment of claim 3 wherein the length of each of the segment assembly studs is especially configured and selected to be about twice the depth of each of the threaded central bores.

5. The side rail segment of claim 4 wherein when a segment assembly stud is inserted and threaded completely into the threaded central bore of a segment assembly stud receiver located proximal to the aft end of a first side rail segment, one half of the length of the segment assembly stud extends beyond the aft end of the first side rail segment and the segment assembly stud receiver proximal thereto thereby enabling, upon insertion and threading of the one half length of the segment assembly stud extending from the aft end of the first segment completely into the threaded central bore of the assembly stud receiver located proximal to the fore end of a second side rail segment, the first and second side rail segments are joined with a strong butt joint; whereby, when a plurality of side rail segments demonstrating pre-selected lengths are joined with said strong butt joint, a custom length vehicular roof top cargo carrier side rail is formed having a length equal to a combined length of the side rail segments so joined.

6. The side rail segment of claim 1 wherein the side rail segment is fabricated from a metal material.

7. The roof top cargo carrier side rail segment of claim 6 wherein the metal material is selected from the group consisting of aluminum, an aluminum alloy, steel and steel alloy.

8. The roof top cargo carrier side rail segment of claim 1 wherein the side rail segment is fabricated from a plastic material.

9. The roof top cargo carrier side rail segment of claim 8 wherein the plastic material is selected from the group consisting of a polycarbonate, a polyvinyl chloride, polypropylene, or composite plastic.

10. The side rail segment of claim 9 wherein the composite plastic is a reinforced carbon polymer.

11. A custom length roof top cargo carrier side rail comprised of a plurality of side rail segments, a plurality of segment assembly studs and a plurality of brackets, wherein;
each of the plurality of side rail segments is formed, shaped and configured as a tube having a circular cross section, a fore end, an aft end, a length as measured from the fore to aft end thereof, a diameter and a longitudinal axis running along a radial center of each such segment, the side rail segments demonstrating a plurality of pre-determined lengths, each of the side rail segments including therewithin two assembly stud receivers, one assembly stud receiver being located and positioned proximal to the fore end and one assembly stud receiver located and positioned proximal to the aft end of each of said side rail segments; wherein
each of the assembly stud receivers is configured to include a hub mounted upon radial arms therewithin, each hub having a threaded central bore longitudinally aligned with the longitudinal axis of each of the plurality of side rail segments and each threaded central bore including threads formed therein especially shaped, dimensioned and configured to mate with and securely retain each of the plurality of segment assembly studs, each of the segment assembly studs demonstrating a length, each threaded central bore including a stop limiting the depth to which a segment assembly stud can be threaded into the central bore to one half the length of the segment assembly stud;
each of the plurality of segment assembly studs has threads formed thereupon which are especially shaped and configured to enable each of the segment assembly studs to thread into and mate with the threaded central bore of adjacent side rail segments so as to join the adjacent side rail segments and each of the plurality of segment assembly studs having a length equal to about twice the depth of each of the threaded central bores; and
each of the plurality of brackets is especially configured to enable each of the plurality of side rail segments and side rails to rotate therewithin; wherein
threading one end of a segment assembly stud into the threaded central bore of the hub of a selected side rail segment having a selected length and, thereafter, threading a portion of the segment assembly stud extending laterally from the selected side rail segment located on an opposite end of the segment assembly stud into the threaded central bore of the hub of an adjacent side rail segment having a selected length forms a strong butt joint therebetween, the side rail segments joined thereby demonstrate a combined length equal to a sum of the length of each side rail segment so joined.

12. The custom length roof top cargo carrier side rail of claim 11 wherein, when a plurality of side rail segments having selected lengths are joined to the adjacent side rail segments joined by a segment assembly stud, a custom length roof top cargo carrier side rail is formed having a length equal to combined lengths of all side rail segments so joined.

13. The side rail segment of claim 11 wherein the side rail segment is fabricated from a metal material.

14. The roof top cargo carrier side rail segment of claim 13 wherein the metal material is selected from the group consisting of aluminum, an aluminum alloy, steel and steel alloy.

15. The roof top cargo carrier side rail segment of claim 11 wherein the side rail segment is fabricated from a plastic material.

16. The roof top cargo carrier side rail segment of claim 15 wherein the plastic material is selected from the group consisting of a polycarbonate, a polyvinyl chloride, polypropylene, or composite plastic.

* * * * *